United States Patent [19]
Kaku et al.

[11] Patent Number: 6,078,624
[45] Date of Patent: Jun. 20, 2000

[54] JUDGING METHOD AND A PRECODING APPARATUS

[75] Inventors: Takashi Kaku; Noboru Kawada; Hideo Miyazawa; Yuri Nigaki, all of Kawasaki, Japan

[73] Assignee: Fujitsu Limited, Kanagawa, Japan

[21] Appl. No.: 08/829,065

[22] Filed: Mar. 31, 1997

[30] Foreign Application Priority Data

| Mar. 31, 1996 | [JP] | Japan | 8-104487 |
| Feb. 5, 1997 | [JP] | Japan | 9-023055 |

[51] Int. Cl.[7] .............................. H04L 5/12; H04L 23/02
[52] U.S. Cl. ........................ 375/261; 375/262; 375/263; 375/341
[58] Field of Search .................................. 375/261, 262, 375/265, 266, 316, 340, 346, 348; 327/304

[56] References Cited

U.S. PATENT DOCUMENTS

| 4,538,284 | 8/1985 | Lang et al. . | |
| 5,150,381 | 9/1992 | Forney, Jr. et al. | 375/260 |
| 5,159,610 | 10/1992 | Eyuboglu et al. | 375/262 |
| 5,214,672 | 5/1993 | Eyuboglu et al. | 375/260 |
| 5,311,547 | 5/1994 | Wei . | |
| 5,396,519 | 3/1995 | Betts et al. . | |
| 5,465,273 | 11/1995 | Cole . | |
| 5,734,681 | 3/1998 | Kaku et al. | 375/265 |

FOREIGN PATENT DOCUMENTS

| 0238822 | 9/1987 | European Pat. Off. . |
| 0283725 | 9/1988 | European Pat. Off. . |
| 0 383 349 | 8/1990 | European Pat. Off. . |
| 0383349 | 8/1990 | European Pat. Off. . |
| 0485108 | 5/1992 | European Pat. Off. . |
| 0490551 | 6/1992 | European Pat. Off. . |
| 0 633 679 A1 | 1/1995 | European Pat. Off. . |
| 0 634 856 A2 | 1/1995 | European Pat. Off. . |
| 0643492 | 3/1995 | European Pat. Off. . |
| 3-010423 | 1/1991 | Japan . |
| 7-273827 | 10/1995 | Japan . |
| 8-018618 | 1/1996 | Japan . |
| WO 92/20162 | 11/1992 | WIPO . |
| WO 93/06550 | 4/1993 | WIPO . |
| 93/13614 | 7/1993 | WIPO . |
| WO 93/25034 | 12/1993 | WIPO . |
| 95 02291 | 1/1995 | WIPO . |
| WO 96/13111 | 5/1996 | WIPO . |

*Primary Examiner*—Chi H. Pham
*Assistant Examiner*—Bryan Webster
*Attorney, Agent, or Firm*—Helfgott & Karas, P.C.

[57] ABSTRACT

A preceding apparatus for calculating a difference between an inputted signal point and an output signal obtained one timing before and outputting the difference has a position information judging unit for judging which position on a vector plane the output signal obtained one timing before is located in, and a signal point selecting storage for outputting any signal point among a plurality of signal points generated correspondingly to a signal point inputted from the outside with a result of the judgement fed form the position information judging unit nd the signal point inputted from the outside as an address, thereby decreasing the number of cycles required by a DSP process and realizing a precoder process in a degree achieved hitherto.

11 Claims, 23 Drawing Sheets

CONFIRMATION OF SUFFICIENCY OF JUDGEMENT PLANE

| LIMIT FRAME | | LOGICAL LIMIT VALUE<br>A | A−120°<br>B | SIGNAL POINT DEVIATION<br>C | JUDGEMENT PLANE DEVIATION<br>D | ANGLE MARGIN<br>B−C−D | JUDGEMENT |
|---|---|---|---|---|---|---|---|
| 0.5 | +SIDE<br>−SIDE<br>WIDTH | 120° | 0° | 8.7°<br>11.7°<br>20.4° | 25°<br>25°<br>50° | −33.7°<br>−36.7°<br>−70.4° | ×<br>×<br>× |
| 1.0 | +SIDE<br>−SIDE<br>WIDTH | 151° | 31° | 8.7°<br>11.7°<br>20.4° | 18.3°<br>18.3°<br>36.5° | +4.0°<br>+1.0°<br>+5.1° | ○<br>○<br>○ |
| 1.5 | +SIDE<br>−SIDE<br>WIDTH | 160° | 40° | +8.7°<br>−11.7°<br>20.4° | | | |
| 2.0 | +SIDE<br>−SIDE<br>WIDTH | 165° | 45° | +8.7°<br>−11.7°<br>20.4° | | | |

FIG. 25(A)
RELATED ART

ORIGINAL 1024 VALUES
SIGNAL POINT

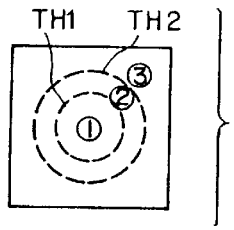

FIG. 25(B)
RELATED ART

PRECODER TAP PLANE

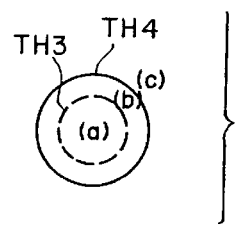

FIG. 25(C)
RELATED ART

| CONTENTS OF PROCESS | | ORIGINAL 1024 VALUES ① | ORIGINAL 1024 VALUES ② | ORIGINAL 1024 VALUES ③ |
|---|---|---|---|---|
| PRECODER TAP PWR | (a) | OUTPUT ORIGINAL AS IT IS | OUTPUT ORIGINAL AS IT IS | ALWAYS SELECT AND TRANSMIT THREE POINTS |
| | (b) | OUTPUT ORIGINAL AS IT IS | SELECT AND TRANSMIT THREE POINTS | ALWAYS SELECT AND TRANSMIT THREE POINTS |
| | (c) | SELECT AND TRANSMIT THREE POINTS | SELECT AND TRANSMIT THREE POINTS | ALWAYS SELECT AND TRANSMIT THREE POINTS |

JUDGING METHOD AND A PRECODING APPARATUS

BACKGROUND OF THE INVENTION

The present invention relates to a judging method and a preceding apparatus suitable for use in a transmitting apparatus such as a modem or the like, in particular, a transmitting apparatus which transmits data using a metallic line of a telephone line, a private line or the like.

A modem is generally used when data is transmitted over a telephone line or the like. There is thus a demand for a modem having a high transfer rate and low in price. Image information has particularly a great information quantity. A modem transmitting such image information needs a transfer rate of, for example, about 1.5 Mbps, higher than that of a modem used to transmit ordinary data.

FIG. 16 is a block diagram showing a structure of a general modem.

In FIG. 16, reference numeral 160 denotes a modem, reference numeral 161 denotes a receiving unit, and reference numeral 162 denotes a transmitting unit.

The receiving unit 161 has an analog/digital converting unit (an A/D converting unit) 161a, a line equalizer 161b, a demodulating unit 161c, a rolloff filter (ROF) 161d, an automatic gain control unit (AGC) 161e, an automatic equalizer (EQL) 161f, a carrier detecting unit (CD) 161g, a timing extracting unit 161h, a clock signal generating unit 161i, etc.

The transmitting unit 162 has a logic processing unit 162a, a rolloff filter (ROF) 162b, a modulating unit 162c, and a digital/analog converting unit (D/A converting unit) 162d.

In the modem having the above structure, a signal point of a transmit data signal is generated through a process conducted by the logic processing unit 162a, and the generated signal point is undergone a waveform shaping process by the rolloff filter 162b, modulated by the modulating unit 162c, after that, converted into an analog signal by the D/A converting unit 162d and transmitted as a data signal.

A received analog data supplied to the receiving unit is converted into a digital signal by the A/D converting unit 161a. After that, the received signal is demodulated by the demodulating unit 161c, undergone a waveform shaping process by the ROF 161d, then supplied to the AGC 161e. The AGC 161e conducts a gain control on the received signal, then supplies the signal to the EQL 161f.

In order to prevent propagation of an error of transmit data, a precoder is provided in the transmitting unit (a part functioning as the above logic processing unit 162a, for example) of the modem.

FIG. 17 is a diagram showing a data transmitting system using partial response (called PR, hereinafter). Partial response is one of non-Nyquist transmission systems.

In FIG. 17, reference numeral 171 denotes a PR filter of a transmitting-side apparatus, reference numeral 172 denotes a low-pass filter (LPF) of a receiving-side apparatus, and reference numeral 173 denotes a judging circuit.

The PR filter 171 adds input data $A_K$ to preceding data $A_{K-1}$, and outputs a result as data $Y_K$ to a line, whose equivalent circuit is as shown in FIG. 18. As shown in FIG. 18, data inputted to the PR filter 171 is stored in a PR tap 171a. An adder 171b adds a value stored in the PR tap 171a to data inputted next to the PR filter 171 and outputs a result.

The data $Y_K$ is transferred to the receiving-side apparatus over a line, and received as data $R_K$ by the receiving-side apparatus. The received data $R_K$ is inputted as data $L_K$ through the LPF 172 to the judging circuit 173, in which a signal-point judgement and the like are conducted.

Here, the data $L_K$ is expressed as:

$$L_K = R_K = Y_K = A_K + A_{K-1}$$

The judging circuit 173 judges the inputted data $L_K$, and outputs data $D_K$ representing a result of the judgement. Here, the result $D_K$ of the judgement is expressed as:

$$D_K = A_K = R_K - A_{K-1}$$

Therefore, if $A_{K-1}$ is determined, the next transmit signal $A_K$ can be determined on the basis of the received signal $R_K$.

However, PR has a disadvantage that if the result $A_{K-1}$, of reception is erroneously judged, judgements on the following signals $A_K$, $A_{K+1}$, . . . result in failure, which leads to propagation of the error. To prevent this, it is possible to provide a precoder in the front stage of the PR filter 171.

FIG. 19 is a diagram showing a system in which the precoder and the PR filter 171 are connected. In FIG. 19, like reference characters designate like or corresponding parts in FIG. 17. Reference numeral 193 denotes a modulo (mod) precoder, and reference numeral 194 denotes a modulo judging unit.

FIG. 20 shows equivalent circuits of the modulo precoder 193 and the PR filter 171 shown in FIG. 19. Here, the PR filter 171 is the same as that shown in FIG. 18. The modulo precoder 193 is configured with a modulo judging circuit 193a, a precoder tap 193b and an adder 193c. The precoder tap 193b stores an output of the modulo judging circuit 193a, the adder 193c then calculates a difference between a precoder tap value and input data.

The modulo precoder 193 calculates a difference between the input data $A_K$ and the preceding output $B_{K-1}$ from the modulo precoder 193, and conducts a modulo operation on the difference. This is described in "Principle of Data Communication" p.p. 97–106, Lattice., for example.

Here, the output $L_K$ of the LPF 172 of the receiving-side apparatus is:

$$L_K = R_K = Y_K = B_K + B_{K-1} = \mod(A_K - B_{K-1}) + B_{K-1}$$

Therefore, a judgement output $D_K$ of the judging circuit 174 is:

$$D_K = \mod(L_K) = \mod(\mod(A_K - B_{K-1}) + B_{K-1})$$
$$= \mod(A_K - B_{K-1} + B_{K-1}) = \mod(A_K)$$
$$= A_K$$

By providing the modulo precoder 193 in the transmitting-side apparatus, it becomes unnecessary to make a judgement on the data $A_K$ on the basis of the data $A_{K-1}$, received in the preceding occasion in the receiving-side apparatus so that an error is not propagated.

However, the modulo operation causes the following problem. Here, the problem will be described by way of an example where the number of signal points are 64 values.

The adder 193c calculates a difference between data inputted to the modulo precoder 193 and a value stored in the precoder tap 193b, and outputs a result to the modulo judging circuit 193a. If constellated on a vector plane, the signal points of 64 values can be constellated in 8×8. For this, a "limit frame" is set to +/−16.

FIG. 21(a) shows signal point constellation of 64 values, whereas FIG. 21(b) shows a setting of a limit frame. It is assumed here that in each of four small rectangular sections (refer to 1 through 4), signal points of 16 values are constellated.

Numbers [refer to (1) through (4)] in outer sections shown in FIG. 21(b) correspond to encircled numbers (refer to 1 through 4) in four inner sections [or four regions in FIG. 21(a)], which shows that these outer regions are shifted from corresponding regions in FIG. 21(a) as a result of the modulo operation.

In FIG. 21(a), the signal points are constellated in a region of +/−8. Namely, a maximum value of the signal is +/−8. The modulo precoder 193 calculates a difference between input data and a precoder tap value, it is then judged whether a value of the difference exceeds +/−16 (/times a region in which the signal point is located). If the value of the difference exceeds +/−16, the modulo operation is conducted on the result.

An output of the modulo precoder 193 is inputted to the PR filter 171. The PR filter 171 adds the output of the modulo precoder 193 to a value outputted in the preceding occasion from the modulo precoder 193 and stored in the filter tap 171a.

Assuming here that a precoder tap value is, for example, −16. If an input to the modulo precoder 193 is −7, an output of the modulo precoder 193 is:

$$-7-(-16)=+9$$

Since the precoder tap value is equal to a value stored in the PR filter tap 171a, an output of the PR filter 171 is:

$$+9+(-16)=-7$$

so that a value equal to a value inputted to the modulo precoder 193 is obtained.

To the contrary, if an input of the precoder 193 is +1, a difference between the precoder tap value and the input value is:

$$+1-(-16)=+17$$

so that the above result exceeds a range of the limit frame. For this, the modulo operation is conducted in this case. As a result, a value +1 obtained by subtracting 16 from +17 is outputted from the precoder.

When the precoder output is added to the PR filter tap value −16, a result is:

$$+1-(-16)=-15$$

This value is different from the precoder input (+1).

If the precoder tap value exceeds the limit frame of the precoder, the modulo operation is conducted to decrease a new precoder tap value, as above. If no module operation is conducted, the precoder tap value is gradually increased, and the precoder tap value may be dispersed. For this, the modulo operation is necessary.

However, an output of the PR filter 171 is shifted by a quantity shifted in the modulo operation, which causes generation of an abnormal peak signal point.

The present applicant has proposed a technique as to a precoder in which a problem caused by the modulo operation has been overcome (Japanese Laid-Open Publication No. 7-273827).

In the above technique, there is employed a circular limit frame as shown in FIG. 22.

A distance from the origin on a vector plane corresponds to a magnitude of a power of a signal. If the limit frame is rectangular as shown in FIGS. 21(a) and 21(b), a power of a signal point at each of the four corners becomes large as compared with those of the others. Since a power of a signal point exerts an affect on the S/N ratio, it is desirable that a power of a signal point is uniform as much as possible. The limit frame shown in FIG. 22 is circular so that a maximum peak value of the signal point power becomes uniform.

Further, according to the above technique, a plurality of signal points are set to an original signal point. If there is possibility that an output of the precoder exceeds the limit frame, the precoder tap coder process is conducted on added signal points along with the original signal point, and a signal point having a minimum signal point power (i.e., a signal point closest to the origin on the vector plane) is selected among these signal points and outputted.

For instance, two signal points B and C are additionally generated in respect to an original signal point A in FIG. 22. In FIG. 22, reference numeral 221 denotes a region in which the original signal point is located, and reference numeral 222 denotes the circular limit frame. The signal points additionally generated are set outside the region in which the original signal point is located.

The signal points A through C are located at 120° apart. However, since the signal points have been quantized, it is sometimes difficult to locate three signal points at exact 120° intervals. In such case, the three signal points are located at angles as closer to 120° as possible.

FIG. 23 shows an example where the precoder tap value is positioned on the circular limit frame. In FIG. 23, reference numeral 231 denotes the limit frame. S1 through S8 denote signal points (precoder tap values) in eight kinds constellated on the limit frame.

On each of the signal points, the three signal points shown in FIG. 22 are overlaid. The origin of the three signal points (refer to FIG. 22) is overlaid on the signal point located on the limit frame. The signal points A through C in FIG. 23 are candidates for a signal point outputted from the precoder this time.

By selecting one signal point located inside the limit frame among the three candidates, it is possible to avoid the above problem generating upon the modulo operation conducted when the precoder tap value exceeds the limit frame. By selecting a signal point closest to the origin among signal points located inside the limit frame, it is possible to select a signal point having a minimum power of a signal point to be transmitted, thereby improving the S/N ratio of a transmit signal.

The number of signal points additionally generated in respect to an original signal point may be not always two. One signal point (two signal points in all when the original signal point is added) or three signal points (four signal points in all when the original signal point is added), for example, may be employed.

If the number of signal points is two, both of the signal points may be outside the limit frame depending on a position of the precoder tap value on the limit frame since an angle made by the two signal points is 180°. If each of intervals of a plurality of signal points is 120° or less, at least one signal point falls within the limit frame no matter which position on the limit frame the precoder tap value is located in. In consequence, it is desirable that a total number of the signal points are three or more.

Here, it is possible to store information as to each signal point (coordinates on the vector plane) in a ROM. If a total number of the signal points increases, the number of signal points to be stored in the ROM increases. For this, it is desirable that a total number of signal points, which are an original point and added signal points, is as small as possible.

It is most desirable that a total number of an original signal point and added signal points are three.

FIG. 24 is a diagram showing an example of an equivalent circuit of a precoder apparatus 240 which selects a signal point located inside the limit frame among such three candidates A through C for a signal point and conducts the precoder process using the selected signal point.

In FIG. 24, thick solid line shows a vector signal, whereas thin solid line shows a scalar signal. Outputs from squaring circuits 242 through 248 are scalar signals, and another outputs are basically vector signals.

A plurality of signal points generating circuit 241 generates the signal points B and C shown in FIG. 22 according to input data representing the signal point A. The plurality of signal points generating circuit 241 is configured with a ROM, which outputs the signal points B and C determined primarily with information of the signal point A as an address.

The information of the signal point A is inputted to the squaring circuits 242 and 243, and squared to determine a power (a position from the origin of the vector plane) of the signal point. Following that, outputs of the square circuits 242 and 243 are compared with reference values TH1 and TH2 by adders 252 and 253, respectively, and results of the comparison are supplied to an original signal point region judging circuit 256.

The original signal point region judging circuit 256 judges which region shown in FIG. 25(A) on the vector plane the original signal point A is located in, according to values fed from the adders 252 and 253.

FIG. 25(A) is a diagram showing a vector plane. As shown in FIG. 25(A), the vector plane is divided into three regions 1, 2 and 3.

Here, it is selected according to a region in which the original signal point is included whether the original signal point A is outputted as it is or one signal point is selected among the signal points A, B and C. If the original signal point is in an inner region 1, it is assumed that a precoder output does not exceed the limit frame so that the original signal may be outputted as it is. If the original signal point is included in an outer region 3, it is assumed that the precoder output exceeds the limit frame so that a signal point having the smallest power is selected among the three signal points.

If the original signal point is included in a region 2, a process to select a signal point is changed according to the precoder tap value since whether the precoder output exceeds the limit frame or not is determined according to the precoder tap value.

The reference value TH1 in FIG. 25(A) is a value corresponding to a boundary between the region 1 and the region 2, whereas the reference value TH2 is a value corresponding to a boundary between the region 2 and the region 3. The original signal point region judging unit 256 judges which region shown in FIG. 25(A) the original signal point is included in, according to magnitudes of outputs of the adders 252 and 253.

Reference numeral 260 denotes a precoder tap, in which a value outputted from an adder 261 is stored. An output of the precoder tap 260 is supplied to the adder 261 along with the squaring circuit 244 and 245, and adders 249, 250 and 251.

Each of the squaring circuits 244 and 245 squares the precoder tap value to determine a power of the precoder tape value (a distance from the origin). Outputs of the square circuits 244 and 245 are supplied to the adders 254 and 255, and compared with reference values TH3 and TH4, respectively.

The reference values TH3 and TH4 are values used to divide the regions a, b and c on the precoder tap plane in FIG. 25(B). The precoder tap value region judging circuit 257 judges which region among regions a, b and c shown in FIG. 25(B) the region of the precoder tap value corresponds to on the basis of a result of comparison made between outputs of the adders 254 and 255. An ABC optimum value selecting circuit 258, which will be described later, switches whether the original signal point is outputted or one signal point is selected among three signal points [refer to a table in FIG. 25(C)].

The signal points A, B and C are inputted to the adders 249, 250 and 251 along with the precoder tap value. Each of the adders 249, 250 and 251 calculates a difference between the precoder tap value and the corresponding signal point A, B or C. Following that, outputs of the adders 249, 250 and 251 are supplied to the squaring circuits 246, 247 and 248, respectively. Each of the squaring circuits 246, 247 and 248 calculates a power as a result of the difference between the precoder tap value and the signal point. A minimum power signal point selecting circuit 259 selects a signal points whose power obtained as a result of the difference between the precoder tap value and the signal point is closest to the origin of the vector plane, and outputs a result.

An ABC optimum value selecting circuit 258 receives the signal points A, B and C, and outputs of the original signal point region judging circuit 256, a precoder tap value region judging circuit 257 and the minimum power signal point selecting circuit 259, and outputs either what is selected as an optimum signal point among the three signal points A, B and C or the original signal point to the adder 261.

The above precoder process has been conducted by a DSP. In the case of a modem whose transfer rate is 28.8 kbps and bau rate is 3.3 kbau, a process cycle number of the modem was 1000 cycles per bau rate.

There is, however, a demand for a modem transferring image information in these years. To meet the demand, a modem whose transfer rate is 1.5 Mbps and bau rate is 192 kbau has been proposed, for example. If a DSP suitable for use in a modem whose transfer rate is 28.8 kbps is employed to the above modem, the number of cycles usable for the precoder process per bau rate is only about 50 cycles.

In the modem communicable at a transfer rate 1.5 Mbps and a bau rate 192 kbau, the number of cycles in total per bau rate in the DSP is about 180 cycles at most. This means that the precoder process occupies 50/180 of the whole process, which is a very large proportion, in order to conduct the above preceding process. As a result, the modem not only has to bear a large load of the process, but also has little margin for the precoder process.

Since the modem whose transfer rate is 1.5 Mbps has to process high-speed signals, the modem requires a certain process cycle number for another processes. It is therefore necessary to provide a number of DSPs in the modem in order to conduct a lot of processes within a short period. As this, it is difficult to realize a modem which can conduct the process at a high speed.

SUMMARY OF THE INVENTION

In the light of the above problems, an object of the present invention is to provide a judging method and a precoding apparatus which can decrease the number of cycles required in the DSP process so as to realize the precoder process in a degree achieved hitherto.

Another object of the present invention is to provide a judging method and a preceding apparatus which can decrease the number of cycles required in the precoder process by making a precoder judgement plane effective.

As an aspect, the present invention provides a judging method used to judge which position on a vector plane an inputted signal point is located in comprising the steps of judging which position on a vector plane divided into a plurality of regions in a phase direction the inputted signal point is located in, and outputting a signal representing coordinates of a representative point corresponding to a judged region on the vector plane.

As another aspect, the present invention provides a preceding apparatus having a precoder adder and a precoder tap to calculate a difference between an inputted signal point and a precoder tap value stored in the precoder tap by the precoder adder and output a result of the calculation besides storing the same in the precoder tap comprising a plurality of signal points generating unit for generating the plurality of signal points corresponding to the inputted signal point, a signal point selecting unit for selecting an optimum signal point among the plurality of signal points and supplying the optimum signal point to the precoder adder, a position information judging unit inputted thereto the precoder tap value to judge a position on a vector plane of the precoder tap value and output position information, a differentiating means inputted thereto the plurality of signal points and the position information to calculate a difference between the position information and coordinate values of each of the plurality of signal points and output results of the calculation, and a minimum point selecting unit lid for selecting a signal point at which an amplitude of a signal is minimum according to the results of the calculation on the basis of outputs from the differentiating means 11c and notifying a result of the selection to the signal point selecting unit, the signal point selecting unit supplying the signal point selected by the minimum point selecting unit to the precoder adder, the position information judging unit judging a position on the vector plane in which the precoder tap value is located using a judgement plane obtained by dividing the vector plane regions in a phase direction thereof and outputting a signal showing coordinates of a representative point representing a vector region plane in which the precoder tap value is located to the differentiating means.

According to this invention, the number of regions on the judgement plane necessary for judgement is decreased upon judging a position of a signal point. It is therefore possible to judge more easily a position of a signal point. Further, the judging mechanism is configured with a ROM (Read Only Memory) so that a processing rate can be increased. Still further, an information quantity of the judgement information is smaller than an information quantity of an output signal, whereby a scale of the ROM can be decreased.

As still another aspect, the present invention provide a preceding apparatus having a precoder adder and a precoder tap to calculate a difference between an inputted signal point and a precoder tap value stored in the precoder tap by the precoder adder, and output a result of the calculation besides storing the same in the precoder tap comprising a plurality of signal points generating unit for generating a plurality of signal points corresponding to a signal point inputted from the outside, a signal point selecting unit for selecting an optimum signal point among the plurality of signal points and supplying the optimum signal point to the precoder adder, a position information judging unit inputted thereto the precoder tap value to judge a position on a vector plane of the precoder tap value and output position information, a differentiating means inputted thereto the plurality of signal points and the position information to calculate a difference between the position information and coordinate values of each of the plurality of signal points and output results of the calculation, and a minimum point selecting unit for selecting a signal point at which an amplitude of a signal is minimum according to the results of the calculation on the basis of outputs from the differentiating means and notifying a result of the selection to the signal point selecting unit, at least the precoder adder and the precoder tap being provided in a digital signal processor, at least the plurality of signal points generating unit, the signal point selecting unit, the differentiating means and the minimum point selecting unit being configured with a read only memory, and outputting an optimum signal point with the signal point inputted from the outside and the position information received from the position information judging unit as addresses.

As still another aspect, the present invention provides a preceding apparatus having a precoder for calculating a difference between an inputted signal point and an output signal obtained one timing before and outputting the difference comprising a position information judging unit for judging which position on a vector plane the output signal obtained one timing before is located in, and a signal point selecting storage for outputting any signal point among a plurality of signal points generated correspondingly to a signal point inputted from the outside with a result of the judgement fed from the position information judging unit and the signal point inputted from the outside as addresses.

In the above case, the signal point selecting storage comprises a vector information storing unit storing unit for storing vector information about a plurality of signal points correspondingly to the signal point inputted from the outside and outputting the vector information about the plurality of signal points with the signal point inputted from the outside as an address, a difference information storing unit for storing information about a difference between a result of the judgement fed from the position information judging unit and the vector information about each of the plurality of signal points fed from the vector information storing unit correspondingly to the vector information about the plurality of signal points and the result of the judgement, and outputting the information about a difference between the result of the judgement and the vector information of the each of a plurality of signal points with the vector information about each of the plurality of signal points and the result of the judgement as addresses, a minimum point information storing unit for storing information about a signal point at which difference information fed from the difference information storing unit is minimum correspondingly to the difference information, and outputting the information about the signal point in which the difference information is minimum with the difference information as an address, and an optimum signal point storing unit for storing information about an optimum signal point that should be selected as the inputted signal point in the precoder correspondingly to the information about the signal point at which the difference information is minimum fed from the minimum point information storing unit and the vector information about each of the plurality of signal points fed from the vector information storing unit, and outputting the information about the optimum signal point that should be selected as the inputted signal point in the precoder with the information about the signal point in which the difference information is minimum and the vector information about each of the plurality of signal points as addresses.

The precoding apparatus according to the present invention may further comprise a dividing unit provided in a front stage of the precoder to divide the bit information fed from the optimum signal point storing unit into the bit information of the real number component and the bit information of the imaginary number component.

According to this invention, only a part of a process by the precoder can be executed by the DSP, whereby a load on the DSP can be decreased and a scale of the apparatus can be also decreased.

Further, information about an optimum signal point outputted from the optimum signal point storing unit can be configured with bit information consisting of a real number component and an imaginary number component configuring vector information. It is thereby possible to collectively output signal point information to the DSP (Digital Signal Processor) so that only one signal line is sufficient to connect the ROM and the DSP. This can simplify a structure of the apparatus.

In the preceding apparatus according to the present invention, the position information judging unit may be configured with a judgement information storage for storing judgement information as to which position on the vector plane an output signal obtained one timing before is located in correspondingly to the output signal obtained one timing before, and outputting the judgement information as to which position on the vector plane the output signal obtained one timing before is located in with the output signal obtained one timing before as an address.

In the above case, the judgement information storage may store the judgement information as to which position on the vector plane divided into a plurality of regions in a phase direction said output signal obtained one timing before is located in if an amplitude of the output signal obtained one timing before is above a predetermined level, and the judgement information as to which position on the vector plane divided into a plurality of grid-like regions said output signal obtained one timing before is located in if an amplitude of the output signal obtained one timing before is below the predetermined level.

In the preceding apparatus according to the present invention, the judgement information may have an information quantity smaller than an information quantity of the output signal obtained one timing before.

According to this invention, the number of regions on the judgement plane necessary for judgement is decreased upon judging a position of a signal point. It is therefore possible to judge more easily a position of a signal point. Further, the judging mechanism is configured with a ROM (Read Only Memory) so that a processing rate can be increased. Still further, an information quantity of the judgement information is smaller than an information quantity of an output signal, whereby a scale of the ROM can be decreased.

BRIEF DESCRIPTION OF THE DRAWINGS

FIG. 14 shows a relation between a radius of the limit frame and an angle margin;

FIGS. 25(A) through 25(C) are diagrams showing a relation among the precoder tap value, a position on a vector plane of an original signal and a signal point to be outputted.

DESCRIPTION OF THE PREFERRED EMBODIMENTS

Figure 1:
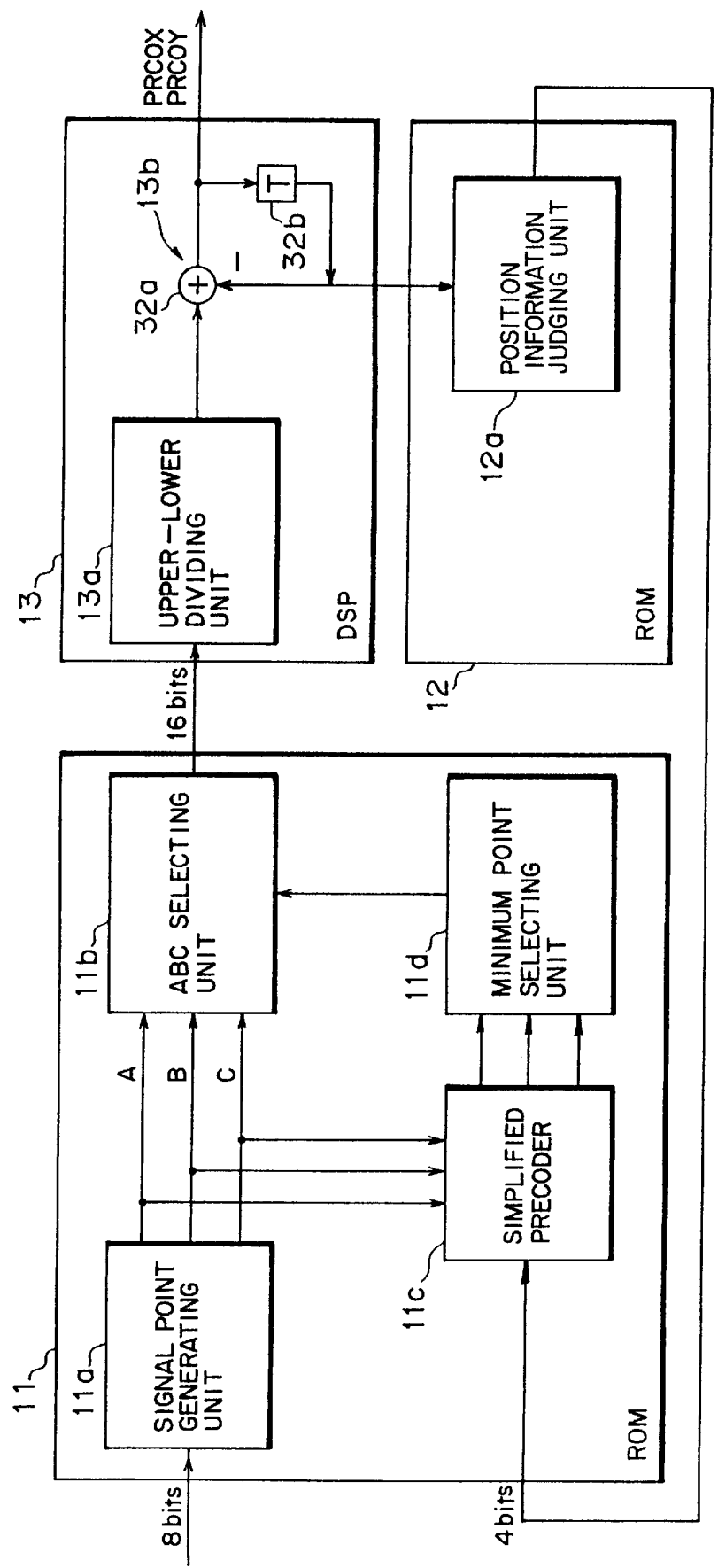
FIG. 1 is a block diagram showing a precoding apparatus according to an embodiment of this invention.

Hereinafter, description will be made of embodiments of the present invention referring to the drawings.

FIG. 1 is a diagram showing a structure of a precoding apparatus according to an embodiment of this invention. The preceding apparatus shown in FIG. 1 is provided in a transmitting unit of a modem having a transfer rate of, for example, about 1.5 Mbps. An output of the preceding apparatus is supplied to the RP filter 171 and the like described before.

In FIG. 1, reference numerals 11 and 12 denote ROMs. Reference numeral 13 denotes a digital signal processor (DSP). In the ROM 11, functions as a signal point generating unit 11a, an ABC selecting unit 11b, a simplified precoder 11c, a minimum point selecting unit 11d are incorporated. The ROM 11 outputs a corresponding signal with all inputted signals as address information.

The DSP 13 has an upper-lower dividing unit 13a and a precoder 13b. The ROM 12 has a position information judging unit 12a.

In a signal route in FIG. 1, thin line shows a scalar signal, whereas thick line shows a vector signal.

Next, an operation of the precoder 13b shown in FIG. 1 will be described.

An 8-bit signal is inputted to the ROM 11. The signal point generating unit 11a outputs an original signal point (A point) corresponding to the input signal and two signal points (B and C points) additionally generated correspondingly to the A point. As stated above, the signal point generating unit 11a is set in the ROM 11, and stores coordinate values on the vector plane of three signal points corresponding to an inputted signal. Therefore, the signal point generating unit 11a outputs information (coordinate values) of three signal points (A through C) with an input signal as an address.

In other words, the signal point generating unit 11a has a function as a vector information storing unit to store vector information about a plurality of signal points correspondingly to a signal point inputted from the outside, and output the vector information about the plurality of the signal points with the signal point inputted from the outside as an address.

The ABC selecting unit 11b selects one signal point among the three signal points outputted from the signal point generating unit 11a with selection information fed from the minimum point selecting unit 11d, which will be described later, as address information, and outputs it to the DSP 13.

In other words, the ABC selecting unit 11b has a function as an optimum signal point storing unit to store information about an optimum signal point that should be selected as an inputted signal point in the precoder 13b correspondingly to information about a signal point whose difference information fed from the minimum point selecting unit 11d is minimum and the vector information about a plurality of signal points fed from the signal point generating unit 11a, and output information about an optimum signal point that should be selected as an inputted signal point in the precoder 13b with the information about the signal point whose difference information is minimum and the vector information about the plurality of signal points as addresses.

Signal point information outputted from the signal point generating unit 11a is composed of a real number component and an imaginary number component, each of 8 bits. The ABC selecting unit 11b outputs a signal of 16 bits which is obtained by adding these two sorts of information. This 16-bit signal is composed of upper 8 bits of a real number component and lower 8 bits of an imaginary number component. Namely, the information about an optimum signal point outputted from the ABC selecting unit 11b is bit information synthesized with a real number component and an imaginary number component constituting the vector information.

The signal point information is collectively outputted to the DSP 13 as above so that only one signal line is required to connect the ROM 11 and the DSP 13.

The DSP 13 has the upper-lower dividing unit 13a which divides a signal of 16 bits received from the ABC selecting unit 11b into upper 8bits (real number component bits) and lower 8 bits (imaginary number component bits), and the precoder 13b which conducts the precoder process on the signals each of 8 bits divided by the upper-lower dividing unit 13a.

Namely, the upper-lower dividing unit 13a provided in the front stage of the precoder 13b has a function as a dividing unit to divide the bit information (of 16 bits, for example) fed from the ABC selecting unit 11b into bit information of a real number component and bit information of an imaginary number component.

The precoder 13b has an adder 32a and a precoder tap 32b. The adder 32a calculates a difference between a precoder tap value fed from the precoder tap 32b and a signal inputted from the upper-lower dividing unit 13a. The precoder tap 32b stores a result of the calculation outputted from the adder 32a, and outputs a stored value one timing after.

A difference value obtained by the adder 32a (a result of the precoder process) is outputted as outputs PRCOX and PRCOY of the precoder 13b. Here, PRCOX is a real number component, whereas PRCOY is an imaginary number component.

The output of the precoder tap 32b is also supplied to the position information judging unit 12a of the ROM 12.

Here, the position information judging unit 12a is supplied the precoder tap value, that is, an output of the precoder 13b outputted one timing before. The precoder tap value is information representing coordinate values of a signal point. The position information judging unit 12a judges a position on a vector coordinate plane of the precoder output with the precoder tap value as address information. The information representing a position of the precoder tap value judged by the position information judging unit 12a is supplied to the simplified precoder 11c.

Namely, the position information judging unit 12a judges which position on the vector plane an output signal outputted one timing before from the precoder tap 32b is located in.

In other words, the position information judging unit 12a is configured with a judgement information storage for storing judgement information as to which position on the vector plane corresponding to an output signal obtained one timing before is located in correspondingly to the same and outputting the judgement information as to which position on the vector plane the output signal obtained one timing before is located in with the output signal obtained one timing before as an address.

As will be described later, information representing a position of the precoder tap value judged by the position information judging unit 12a is compressed to information of 4 bits as compared with the original vector information of 8 bits and outputted. Namely, the judgement information fed from the position information judging unit 12a has an information quantity smaller than an information quantity of the output signal obtained one timing before.

The simplified precoder 11c as a differentiating means holds information about a difference between each of signal points A through C and position information fed from the position information judging unit 12a with the position information (coordinate values) supplied from the position information judging unit 12a and coordinate values of these three signal points A through C generated by the signal point generating unit 11a as the address information.

Namely, the simplified precoder 11c outputs information about a difference between position information supplied from the position information judging unit 12a and signal point information of three signal points given by the signal point generating unit 11a with these two sorts of information as the address information, thereby conducting a simplified precoder process.

In other words, in the simplified precoder 11c, a function to calculate a difference between position information (coordinate values) given by the position information judging unit 12a and coordinate values of each of three signal points generated by the signal point generating unit 11a and output a result to the minimum point selecting unit lid is realized in a ROM (Read Only Memory).

Although the position information given by the position information judging unit 12a is not accurate coordinate values of the precoder tap value, it is sufficient to grasp an approximate position.

Therefore, the above simplified precoder 11c functions as a difference information storing unit for storing information about a difference between a result of judgement and vector information about a plurality of signal points correspondingly to the vector information about the plurality of signal points supplied from the signal point generating unit 11a and the result of judgement fed from the position information judging unit 12a, and outputting information about the difference between the result of judgement and the vector information about each of the plurality of signal points with the vector information about the plurality of signal points and the result of judgement as addresses.

The minimum point selecting unit 11d holds information about a signal point having a minimum signal point power obtained as a result of a difference between each of three signal points A through C generated by the signal point generating unit 11a and judgement information of a precoder output obtained one timing before with three output values supplied from the simplified precoder 11c as the address information.

Namely, the minimum point selecting unit 11d has a function as a minimum point information storing unit for storing information about a signal point at which difference information is minimum correspondingly to the difference information supplied from the minimum point selecting unit 11d, and outputting information about the signal point at which the difference information is minimum with the difference information as an address.

In other words, in the minimum point selecting unit 11d, a function to judge which result of a difference among results of differences between coordinate values given by the position information judging unit 12a and respective signal points A through C has a minimum signal point power, that is, which result of a difference is closest to the origin on the vector plane, and supply a result to the ABC selecting unit 11b is realized in the ROM (Read Only Memory).

Whereby, the ABC selecting unit 11b selects a signal point at which a result of a difference is closest to the origin on the vector plane among three signal points generated by the signal point generating unit 11a on the basis of a result of judgement by the minimum point selecting unit 11d, and outputs a signal of 16 bits representing coordinates of this signal point to the upper-lower dividing unit 13a.

In other words, the ROM 11 functions as a signal point selecting storage for outputting any one signal point among a plurality of signal points generated correspondingly to a signal point inputted from the outside with a result of judgement fed from the ROM 12 and the signal point inputted from the outside as addresses.

Figure 2:
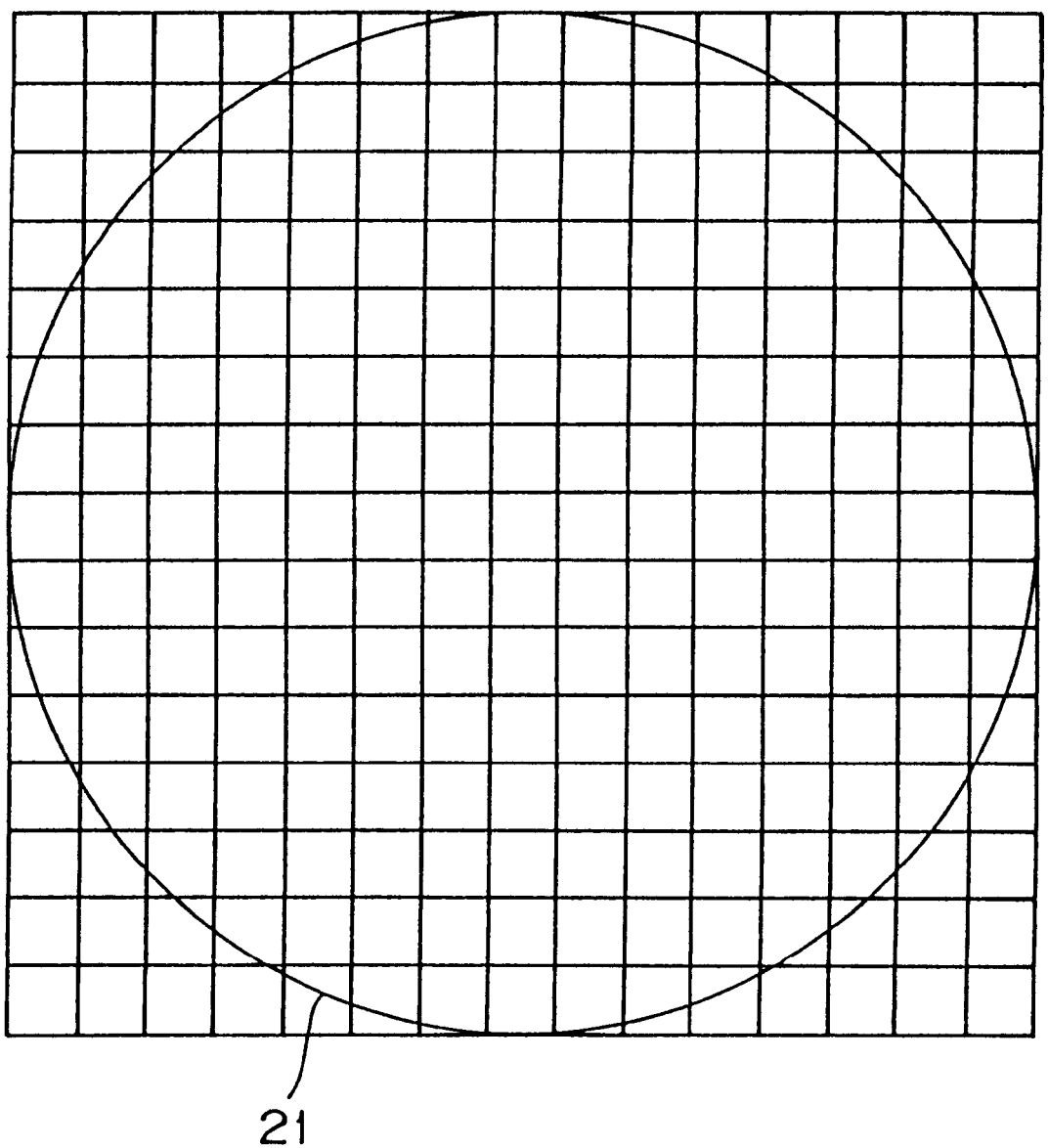
FIG. 2 is a diagram showing a precoder judgement plane divided into grids.

FIG. 2 is a diagram illustrating a technique used to judge a position on a precoder plane by the position information judging unit 12a. In FIG. 2, reference numeral 21 denotes a limit frame.

In FIG. 2, the precoder plane is divided into grids, where it is judged which position on the precoder plane a precoder tap value is located in, on the basis of the precoder tap value inputted to the position information judging unit 12a. The position information judging unit 12a is configured with the ROM 12 as stated above, which outputs position information with the precoder tap value as an address.

Dividing the precoder plane as shown in FIG. 2 is a desirable manner in judging a position of the precoder tap value. However, it causes an increase in information quantity to be stored in the ROM 12, leading to an increase of the number of bits of the position information.

Since an output from the position information judging unit 12a is information representing a divided region in FIG. 2, the position information requires n bits if the precoder plane is divided into nxn regions, for example. To know a position in which the precoder tap value is located more accurately, it is necessary to finely divide the vector plane. However, this causes an increase of the number of bits of the position information.

Further, information of 8 bit is supplied to the ROM 11 along with the position information so that a scale of the ROM may increase if the number of bits of the position information excessively increases. When considering a scale of the ROM, dividing the precoder plane into grids is disadvantageous.

Figure 3:
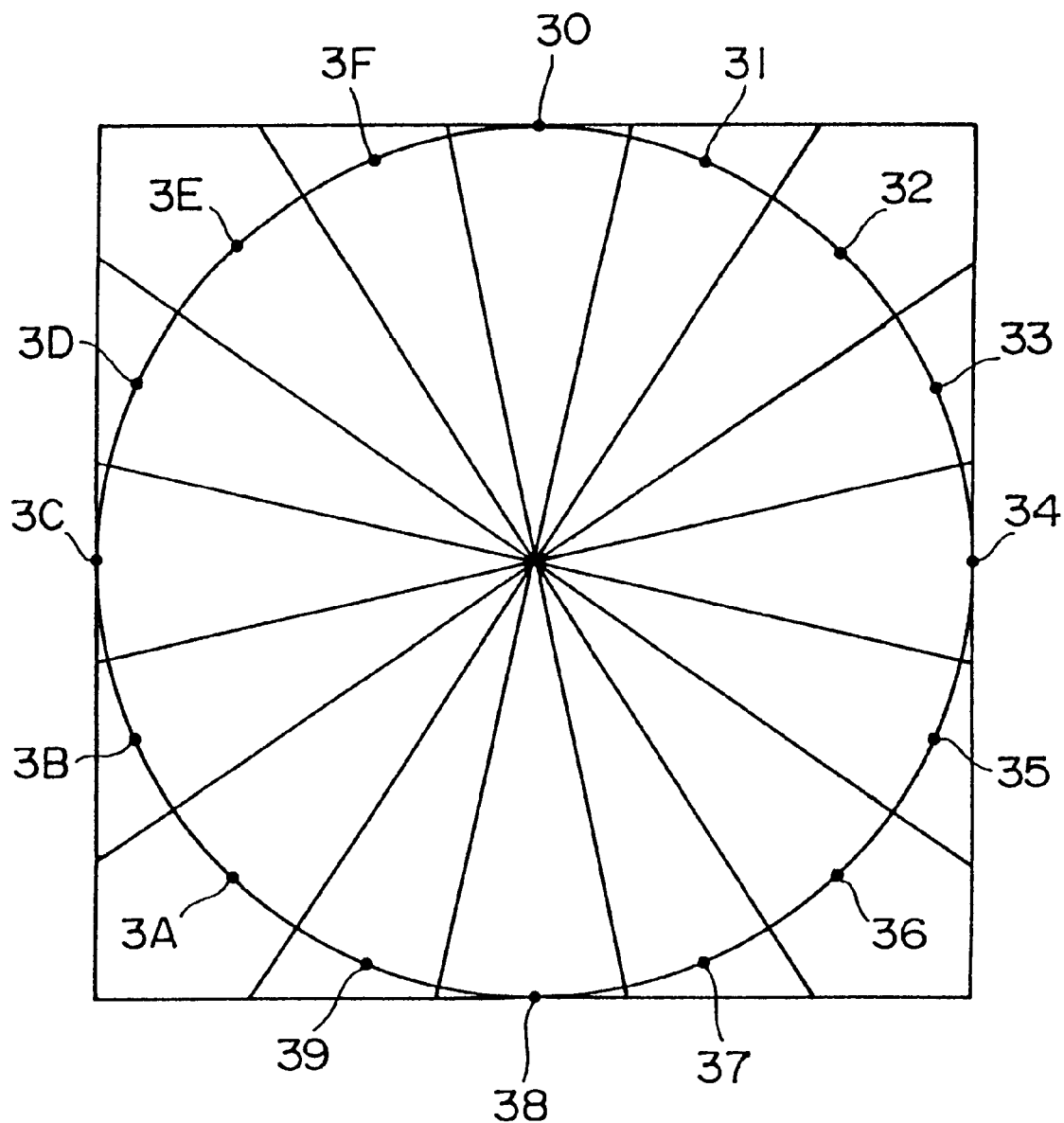
FIG. 3 is a diagram showing a precoder judgement plane divided in a phase direction.

FIG. 3 is a diagram showing a method of dividing the precoder plane in order to solve the above problem. In the case of FIG. 3, the precoder plane is divided into 16 regions in its phase direction. Each of the regions has a central angle of 22.5°. A representative point is given to each of the divided regions. 30 through 3F in FIG. 3 are the representative points. In FIG. 3, each of the representative points is located in a position having an equal distance from the origin of the vector plane (on a circumference of a circle 3a in FIG. 3), and at a center of the angle (in a position at 12.25°) of each of the judgement regions.

The position information judging unit 12a judges which region among the regions divided into 16 an inputted precoder tap value is located in, and outputs a representative point in a corresponding region to the simplified precoder 11c. In the case shown in FIG. 1, the position information judging unit 12a is configured with the ROM 12 so that coordinates of a representative point corresponding to the inputted precoder tap value is stored in the position information judging unit 12a.

For this, the position information judging unit 12a retrieves a corresponding representative point with the precoder tap value as an address, and notifies it to the simplified precoder 11c. If the position information judging unit 12a is configured with a ROM or the like, the position information judging unit 12a does not practically judge a position of the precoder tap value.

Since the number of the representative points are 16 in the case shown in FIG. 3, the position information to be outputted to the simplified precoder 11c may be of 4 bits.

In the preceding apparatus with the above structure according to the embodiment of this invention, the ROM 11 outputs, as bit information of 16 bits, an optimum signal point (i.e., a signal point having a value which can output a value not exceeding a limit value if the precoder process is conducted) among a plurality of signal points generated correspondingly to a signal point inputted from the outside with a result of judgement (of 4 bits) supplied from the position information judging unit 12a and the signal point (of 8 bits) inputted from the outside as addresses.

The upper-lower dividing unit 13a divides 16 bits into upper 8 bits (a real number component) and lower 8 bits (an imaginary number component), and the precoder 13b conducts the precoder process with the divided signals as an input signal to calculate a difference between the input signal and an output signal outputted one timing before and outputs a result.

The position information judging unit 12a judges which position on the vector plane divided into a plurality of regions in the phase direction a signal point inputted from the precoder tap 32b is located in, and outputs a signal showing coordinates of a representative point corresponding to the judged region on the vector plane as a result (of 4 bits) of the judgement to the ROM 11.

In the position information judging unit 12a, it is sufficient to store coordinates of a representative point corresponding to the precoder plane divided in the phase direction as shown in FIG. 3. A reason of this will be described next.

Figure 4:
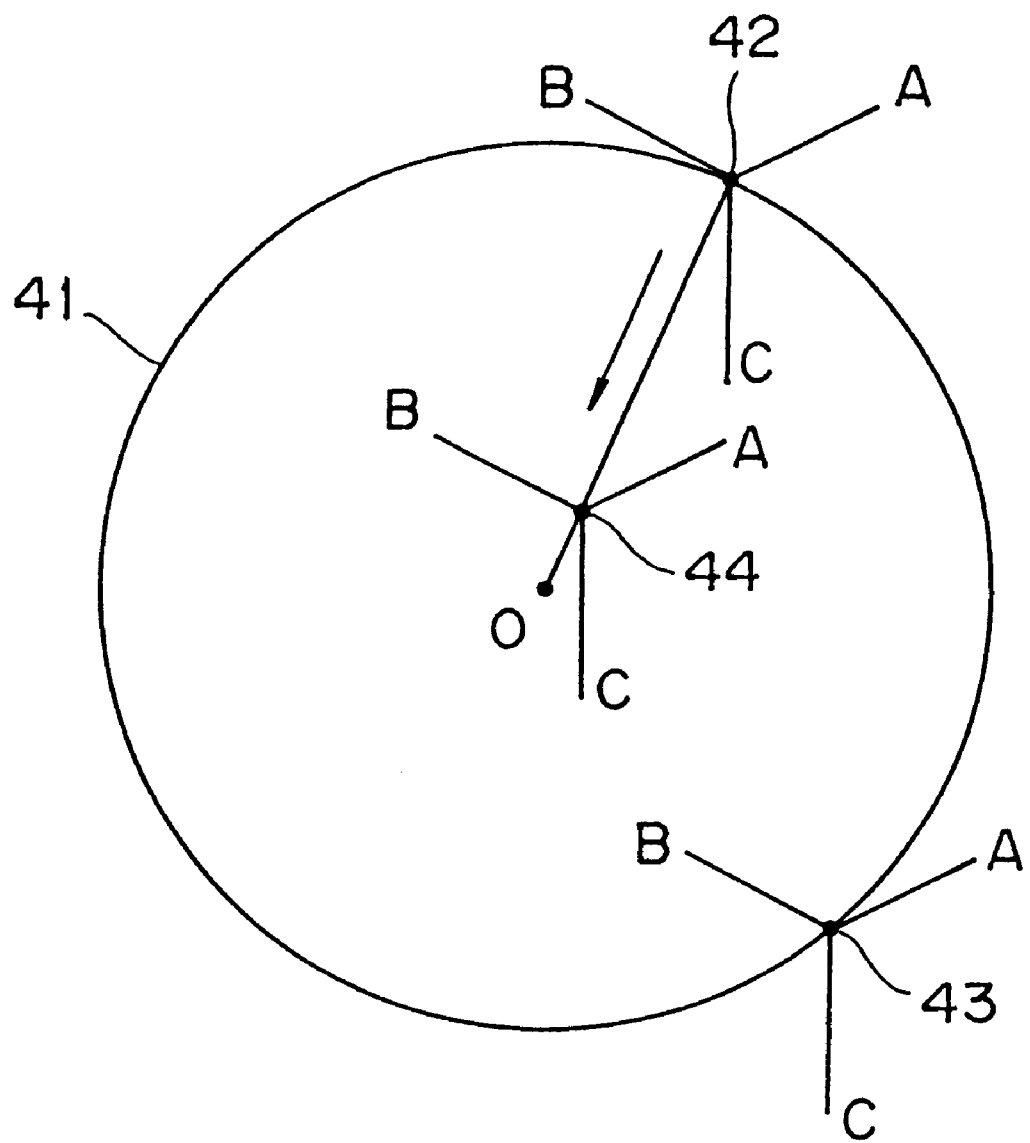
FIG. 4 is a diagram showing signal point constellation when a precoder tap value is shifted in a phase direction and an amplitude direction.

FIG. 4 is a diagram showing the precoder plane divided in a phase plane direction. In FIG. 4, reference numeral 41 denotes a limit frame, and reference numerals 42 through 44 denote representative points corresponding to respective precoder tap values. In FIG. 4, there are shown three signal points generated by the signal point generating unit 11a overlaid on each of the representative points 42 through 44.

The representative points 42 and 43 are located on the limit frame, which are under the same conditions excepting that the phases of the 5 precoder tap values of the respective representative points are different. The representative point 44 is in the same phase as the representative point 42, but positions in the amplitude direction of these representative points 44 and 42 are different. The representative point 44 can be obtained by shifting the representative point 42 shifted inwardly on the precoder plane. In order to equalize conditions used to compare, the signal points A through C overlaid on each of the precoder tap values at the representative points 42 through 44 are considered to be the same signal point.

When the representative point 42 is compared with the representative point 43, the signal point C of the representative point 42 is located inside the limit frame, whereas the others A and B are located outside the limit frame. It is known that the signal point C is closest to the origin in the case of the representative point 42. On the other hand, the signal point B of the representative point 43 is located inside the limit frame, whereas the others A and C are located outside the limit frame. Therefore, the signal point B is a signal point closest to the origin in the case of the representative point 43.

Namely, as seen from comparison of the representative point 42 with the representative point 43, a signal point having a minimum power is different when a position in the phase direction of the precoder tap value is different.

On the other hand, signal points overlaid on the representative point 44 all fall in the limit frame. When comparing distances of the three signal points from the origin, it is known that the signal point A is farthest from the origin, whereas the signal point C is closest to the origin. When 42 is compared with 44, a signal point closest to the origin is the signal point C in common. It is known from this that a shift of the precoder tap value in the amplitude direction does not exert any effect on selection of a signal point having a minimum power.

For this, the precoder plane is divided in the phase direction as shown in FIG. 3 according to this embodiment, and representative points are supplied to the simplified precoder 11c. Further, since the number of the representative points is in equal to the number of the regions, the number of bits of the position information is far smaller than a case where the precoder plane is divided into grids and a point representing each of the grids (a center of the grid region, for example) is supplied as the position information (refer to FIG. 2).

If the precoder tap value is shifted in the phase direction, a relation of a signal point closest to the origin remains the same as long as a quantity of the shift of the signal points is within the region divided into 16 shown in FIG. 3, for example. In consequence, it is unnecessary to divide so finely the precoder plane.

When the precoder plane is set, the signal points and the like are quantized since the precoder conducts a process with digital values. For this, the precoder plane set in the precoder is not actually divided by straight lines as shown in FIG. 3, but divided approximately in the phase direction as regions surrounded by two circles 51 and 52, respectively as shown in FIG. 5 (refer to "0" through "F").

In a judgement plane shown in FIG. 5, judgement is made in regions divided into grids with regard to regions in the vicinity of the origin, whereby an accuracy in the judgement can be increased than a case where the judgement is made on the judgement plane divided in the phase direction over the entire region, as will be described later. It is further possible to improve an accuracy in selecting an optimum point by the ROM 11.

Figure 5:
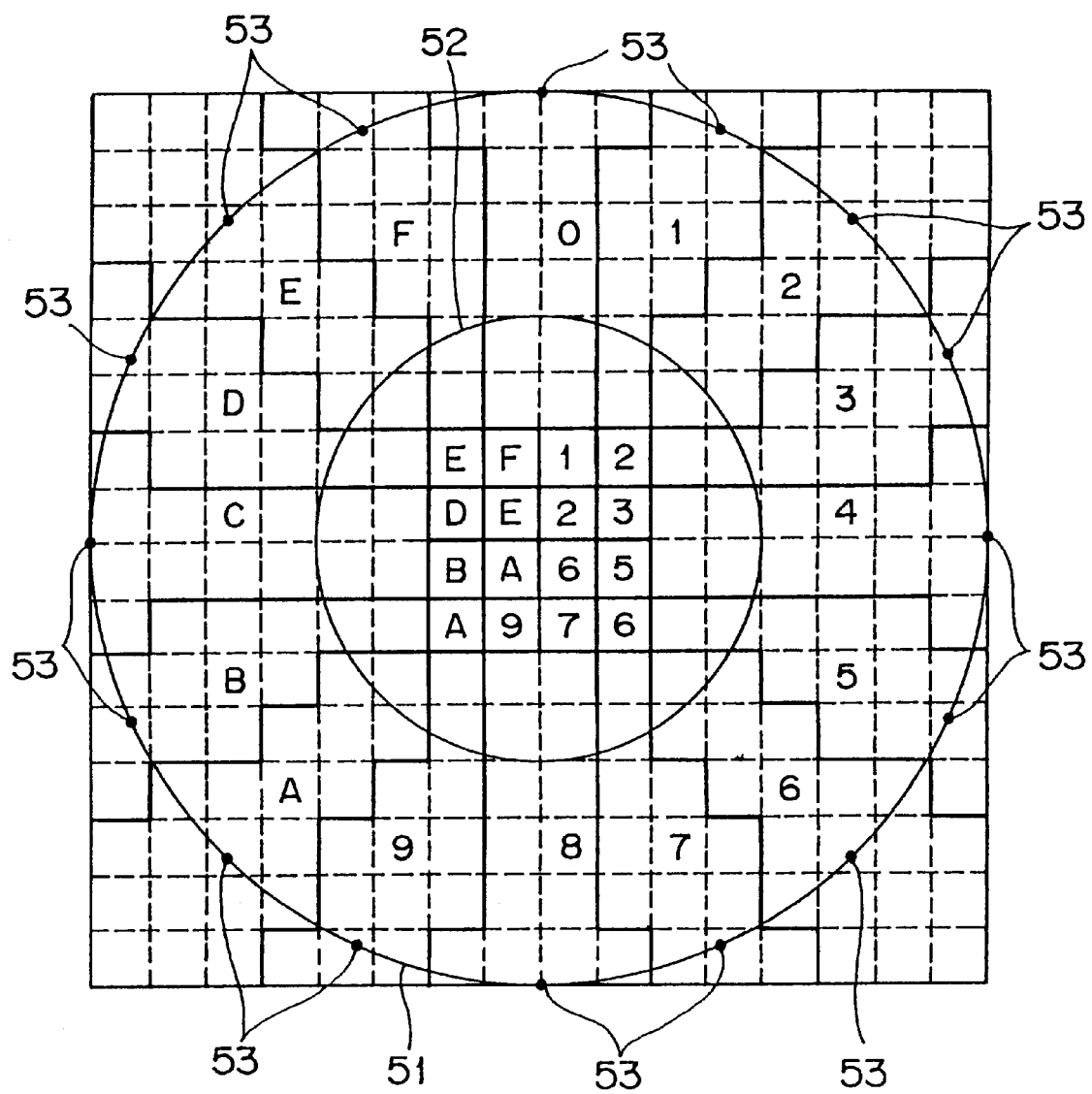
FIG. 5 is a diagram showing an example in which a quantized judgement plane is divided in a phase direction.

As stated above, the position information judging unit 12a can make a judgement using the judgement plane shown in FIG. 5 described above by a read access to the ROM 12, thereby outputting a result of the judgement with a signal outputted from the precoder tap 32b as the address information.

In other words, the position information judging unit 12a as the judgement information storage can store judgement information as to which position on the vector plane divided into a plurality of regions (refer to "0" through "F") in the phase direction a signal point is located in when an amplitude of an output signal obtained one timing before is above a predetermined level (a radius of the circle 52, for example), and judgement information as to which position on the vector plane divided into a plurality of grid-like regions a signal point is located in when an amplitude of an output signal outputted one timing before is below a predetermined level (a radius of the circle 52, for example).

Each of the grids indicated by dotted lines shown in FIG. 5 is quantization unit. On the precoder plane shown in FIG. 5, a region within the circle 52 in which an original signal point is located is divided into grids, and a point representing each grid (a center of a region of grid, for example) is supplied as position information.

The outer circle 51 is a circular limit frame of the precoder, whereas the inner circle 52 is a region in which an original signal point is located. Parts indicated by solid line in FIG. 5 are dividing lines dividing the precoder plane in the phase direction. A representative point 53 in each region is located on the limit frame 51.

In FIG. 5, the precoder plane is divided into 16 regions from "0" to "F". Each of the regions approximately shows a region obtained by dividing an inner part of the circle into 16 regions by straight lines in the phase direction. 16 grids inside the circle is divided in a manner different from a manner of dividing grids outside the circle.

A representative point 53 is shown by a dot in the drawing. Coordinates of the center of a grid to which a representative point 53 belongs, for example, is outputted as coordinates of the representative point. For this, an error in angle is generated between coordinates of an actual representative point and coordinates of a representative point outputted as a result of judgement.

Figure 6A:
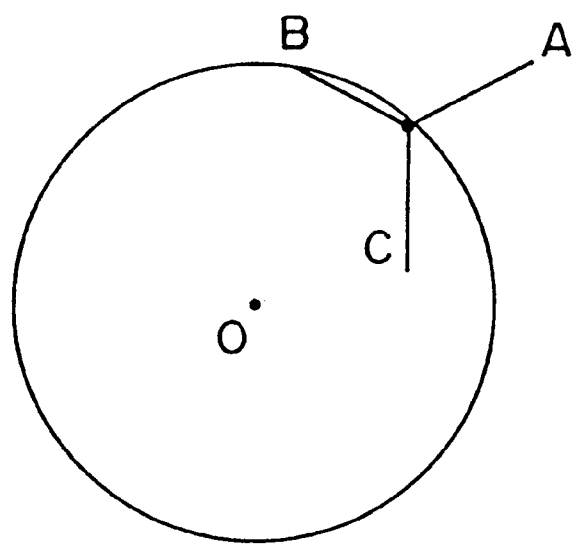
FIGS. 6(a) and 6(b) are diagrams for illustrating a mode of judging a position of the precoder tap value and a minimum power signal point.

As shown in FIG. 6(a), if the precoder tap value is away from the origin, it is easy to recognize which region the tap value falls in, or easy to recognize which signal point is closest to the origin. In particular, if the tap value is in the vicinity of the limit frame, a signal point falling within the limit frame can be clearly distinguished from a signal point outside the limit frame so that judgement on a signal having a minimum power is easier.

Figure 6B:
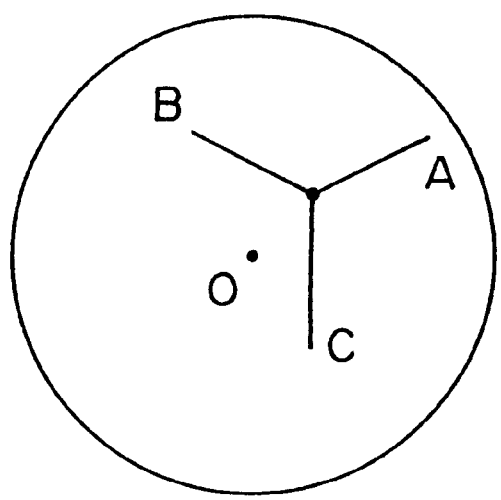

On the contrary, when the tap value is closer to the origin as shown in FIG. 6(b), all signal points A through C fall within the limit frame. In consequence, it is difficult to judge which signal point A, B or C is closest to the origin. In particular, there is a case where it is difficult to judge either signal point B or C within the inner region of the precoder plane is closer to the origin. For this, on the judgement plane shown in FIG. 5, the judgement plane consists of grids with respect to a region closer to the origin to improve an accuracy in judging a region of the precoder tap value.

Now, a relation between an area (corresponding to a maximum peak value of a signal point) of a region in which an original signal point is located and an area of the limit frame of the precoder will be described.

As described before, the precoder inverts polarity of a signal $b_k$ outputted in the past ($=b_{k-1}$) as a precoder tap value, adds the signal ($b_{k-1}$) having the inverted polarity to the original signal point $a_k$, and outputs a result $b_k=a_k-b_{k-1}$ as the next output signal.

Figure 7A:
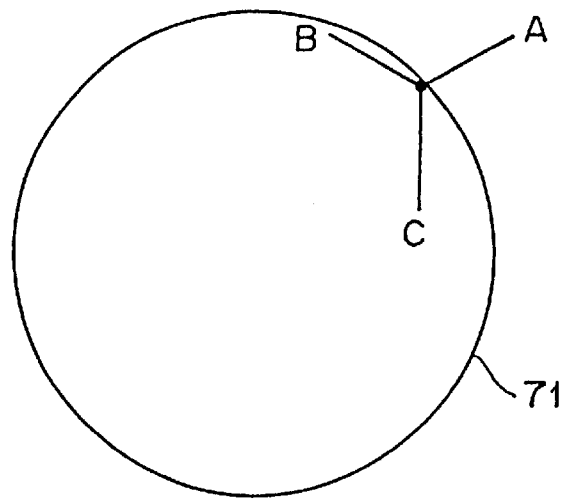
FIGS. 7(a) through 7(c) are diagrams for illustrating that Nyquist level increases when a power of a precoder output increases.

It is here assumed that an area of the limit frame of the precoder is greater than a peak value of a signal point as shown in FIG. 7(a). Namely, in judgement using a limit frame 71, a distance $b_k$ of each signal point from the origin is large. FIG. 7(a) shows an example in which an amplitude of a signal point is maximum. A size of the limit frame 71 shows a maximum value of a power that a signal stored in the precoder tap 32b can take.

Figure 7B:
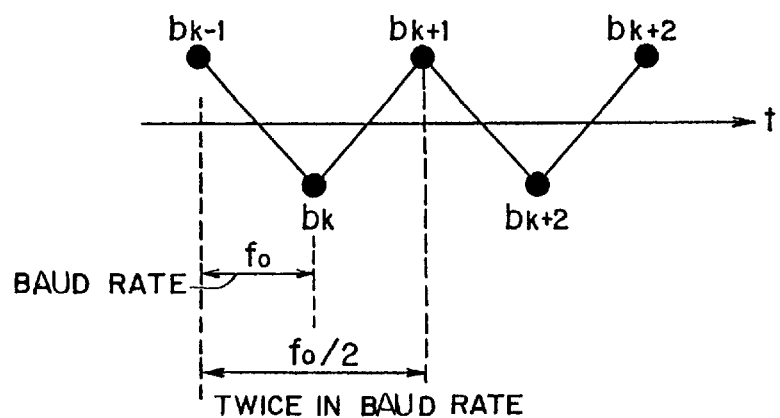
Figure 7C:
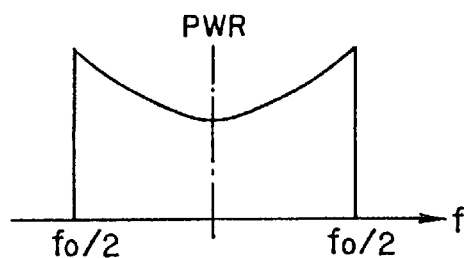

If a precoder tap value $b_{k-1}$ is sufficiently large, the signal point ak is small so that a new precoder output $b_k$ is assumed to be $-b_{k-1}$. Therefore, the precoder output is given by equations (1) through (3) below, which is shown in FIG. 7(b) when represented along a time axis, and shown in FIG. 7(c) when represented along a frequency axis:

$$b_k=a_k-b_{k-1}\approx-b_{k-1} \quad (1)$$

$$b_{k-1}\approx-b_k \quad (2)$$

$$b_{k+2}\approx-b_{k+1} \quad (3)$$

In such case, a power of an output of the precoder exceeds a peak of a signal point. As a result, in a transmit spectrum, the Nyquist level (corresponding to both ends of a signal band of the transmit spectrum) is abnormally increased as shown in FIG. 7(b).

There is a case where a power of an output of the precoder exceeds a peak of a signal point when the Nyquist level abnormally increases. In which case, an S/N error rate of a signal to be transmitted is rapidly deteriorated. This tendency becomes more noticeable as a size of the limit frame increases.

Figure 8A:
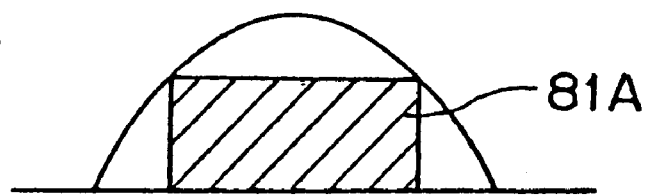
FIGS. 8(a) and 8(b) are diagrams for illustrating that when a precoder limit frame is removed, an effective bandwidth diminishes.
Figure 16:
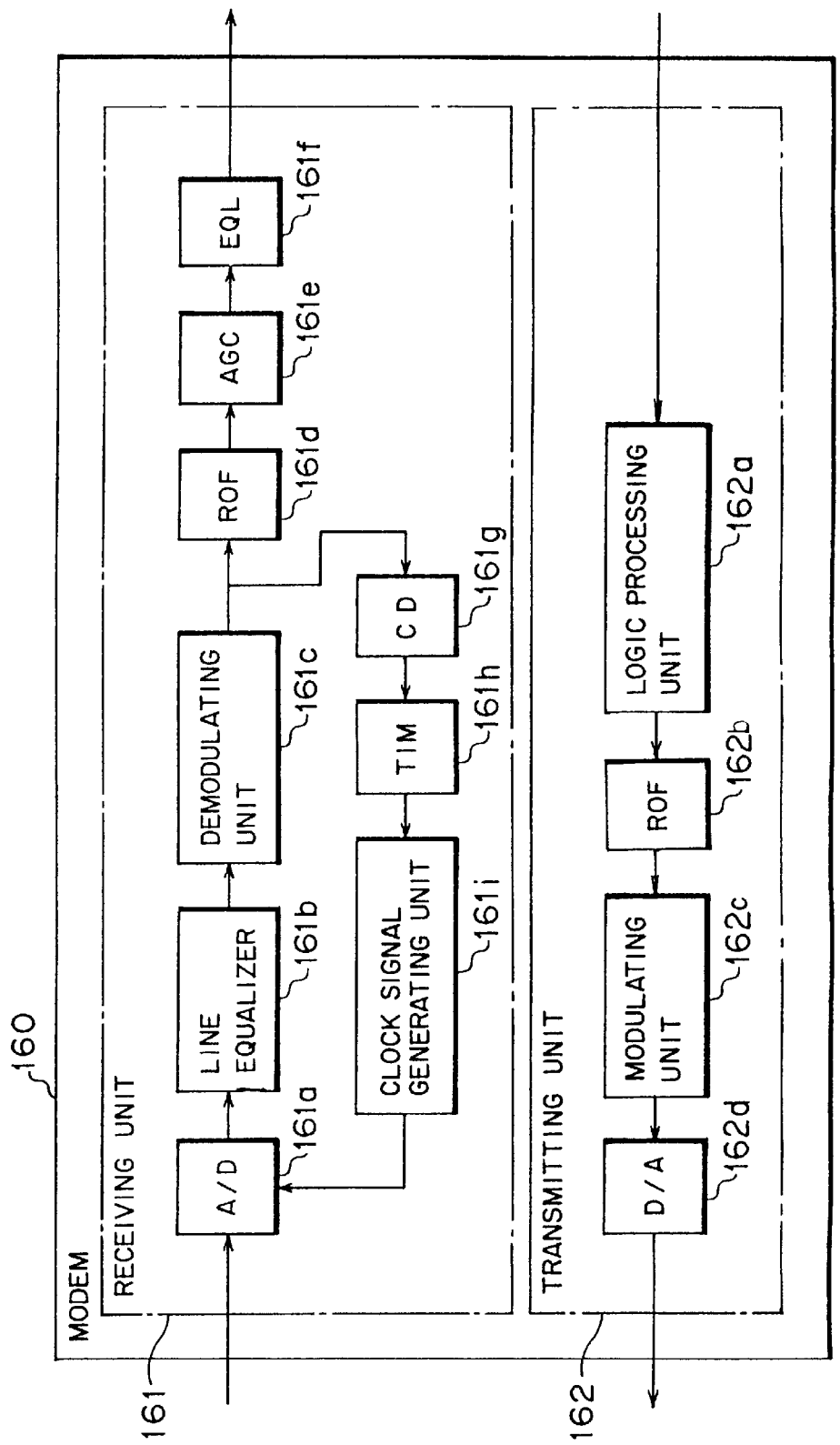
FIG. 16 is a block diagram showing a structure of a general modem.
Figure 17:
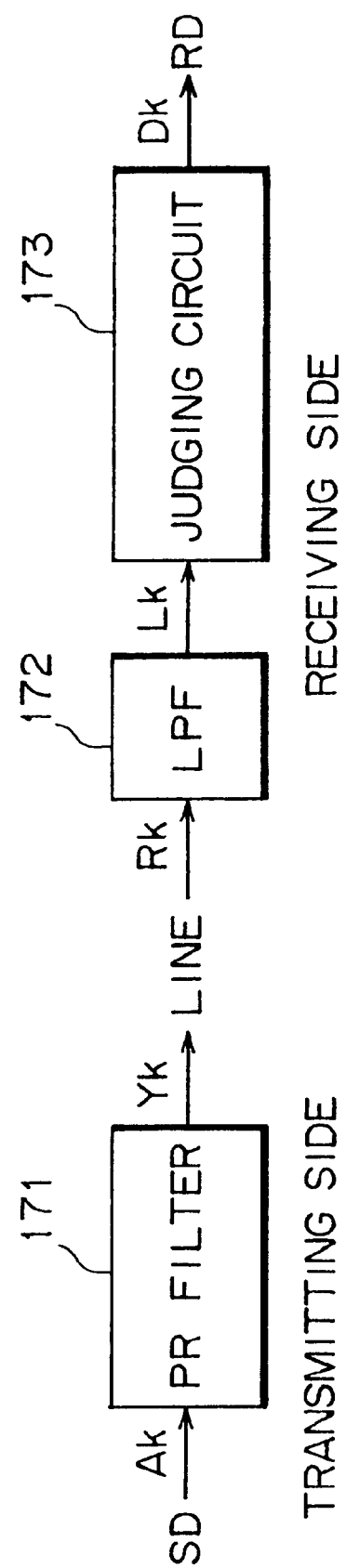
FIG. 17 is a block diagram showing an example of a modem in which partial response is used.
Figure 18:
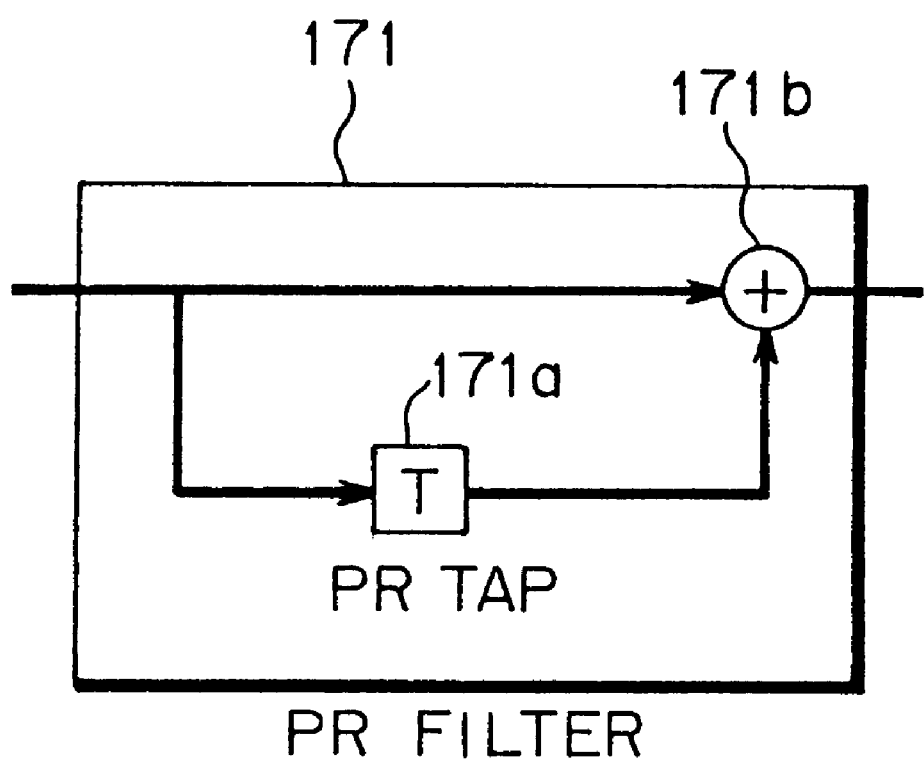
FIG. 18 is a diagram showing an equivalent circuit of a partial response filter.
Figure 19:
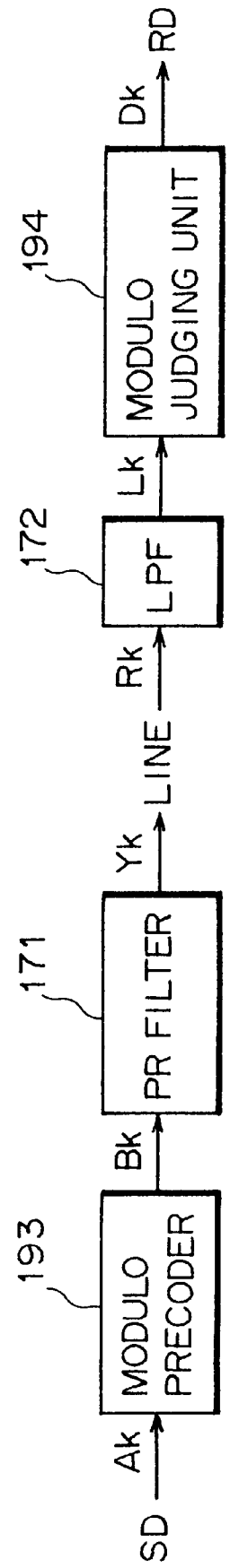
FIG. 19 is a block diagram showing an example of a modem in which a modulo precoder is used.
Figure 20:
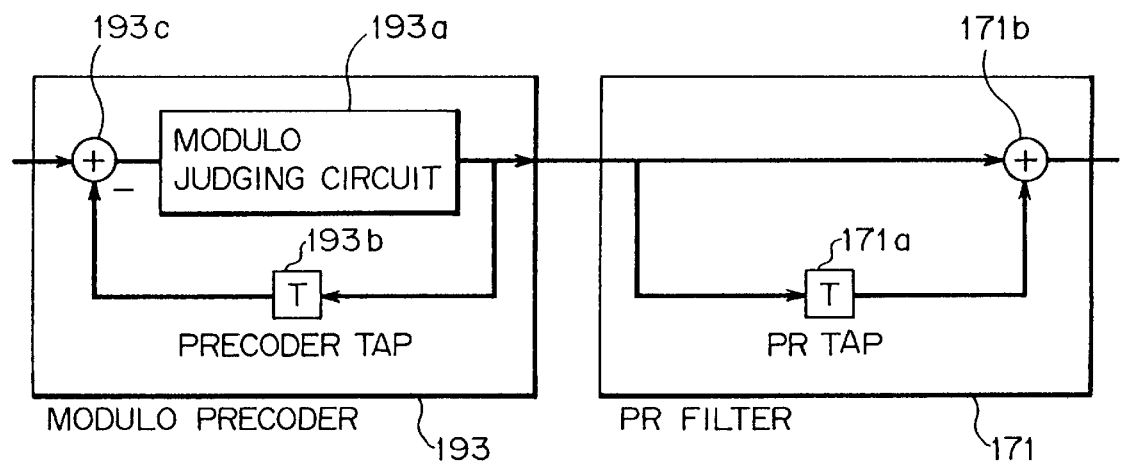
FIG. 20 is a diagram showing equivalent circuits of a modulo precoder and a PR filter.
Figure 21A:
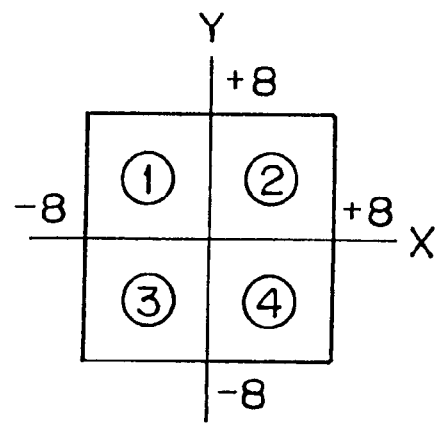
FIGS. 21(a) and 21(b) show a signal point constellation plane and a range of a limit frame, respectively.
Figure 21B:
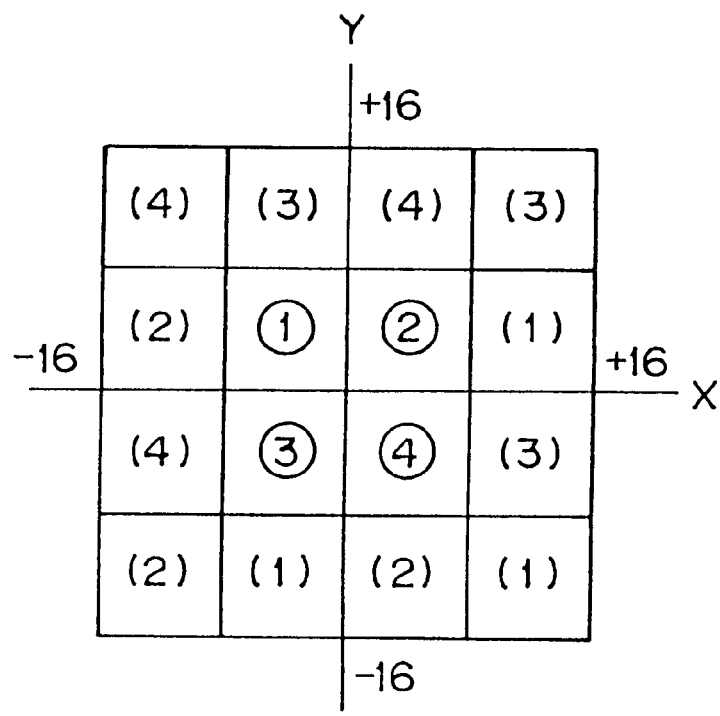
Figure 22:
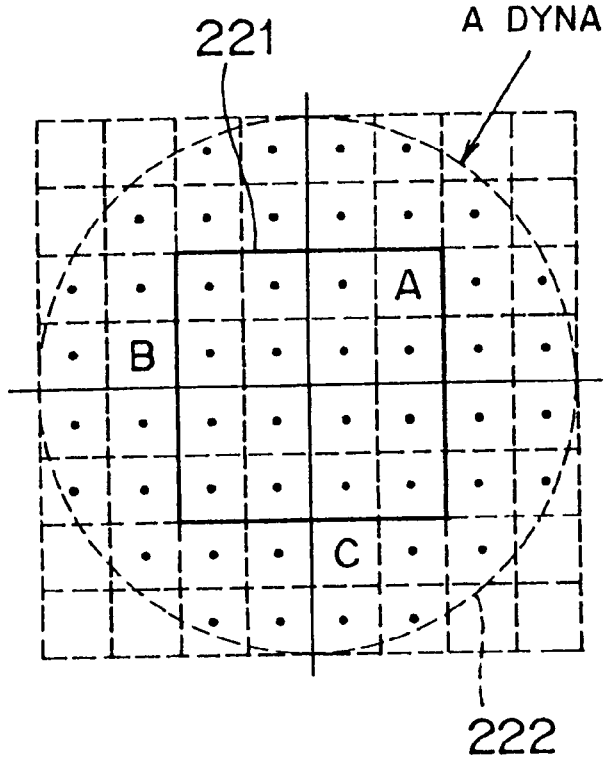
FIG. 22 is a diagram showing an example of a circular limit frame and constellation of a plurality of signal points.
Figure 23:
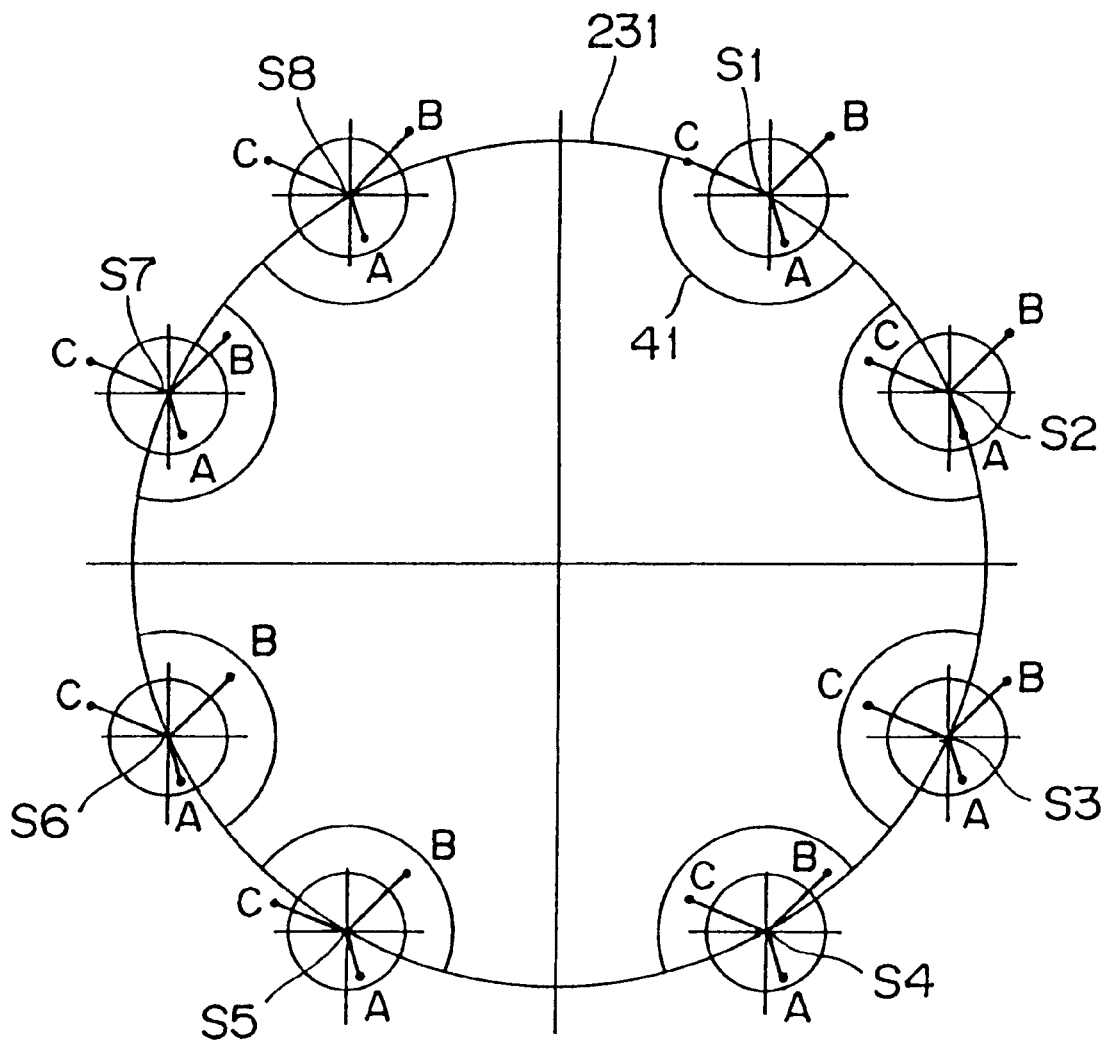
FIG. 23 is a diagram showing constellation of a plurality of signal points when the precoder tap value is located on the precoder limit frame.
Figure 24:
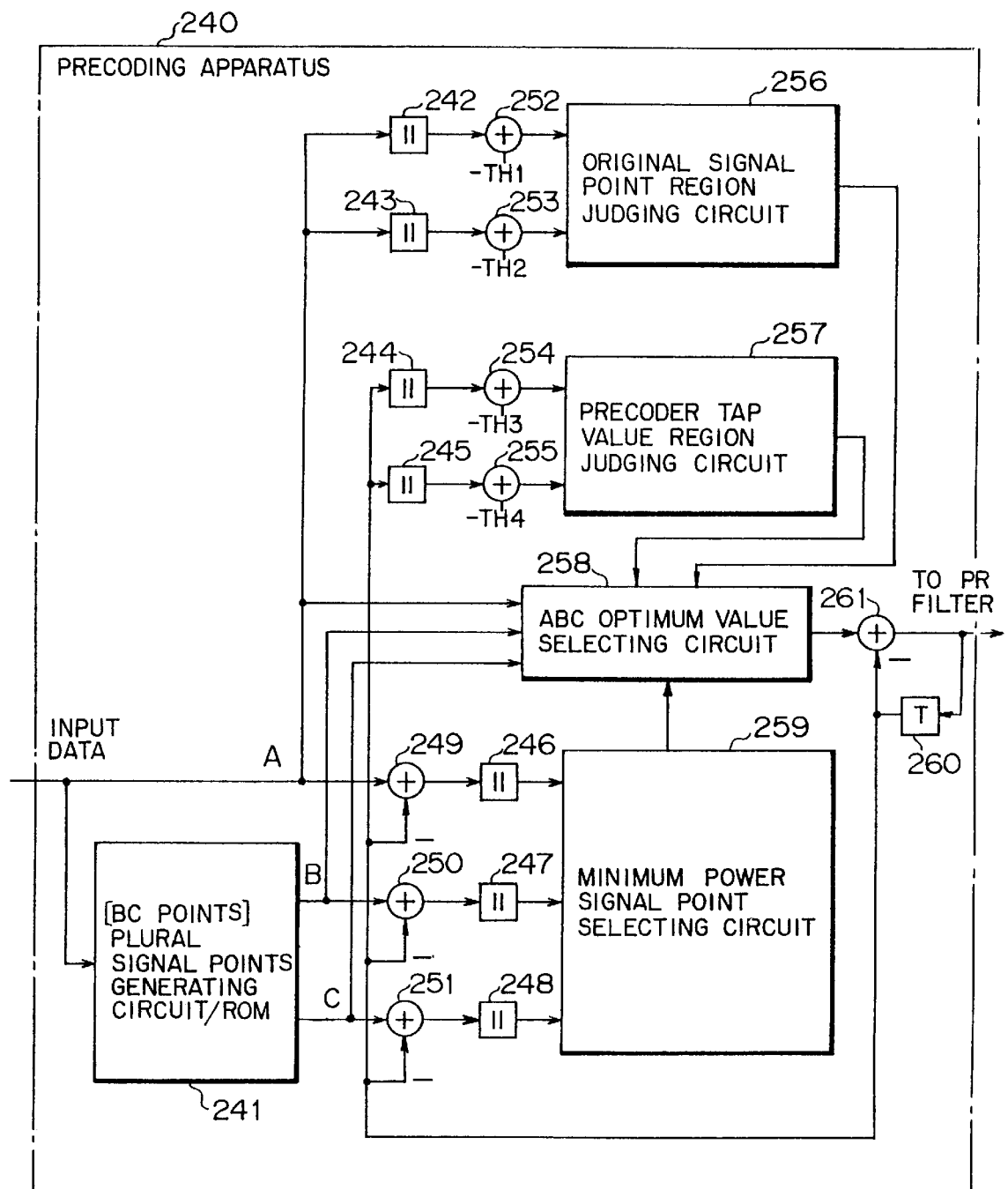
FIG. 24 is a diagram showing an example of an equivalent circuit of a precoder.

When the limit frame of the precoder is completely removed (i.e., when the limit frame is minimum), an effective band width of the transmit spectrum is decreased as a region 81A shown in FIG. 8(a). Namely, since the rolloff filter (refer to reference numeral 162b in FIG. 16) in the rear stage takes a band lower than a peak value of an output of a filter having cos filter characteristics by 3 dB, an effective bandwidth of a transmit spectrum decreases when an area of the limit frame decreases.

Figure 8B:
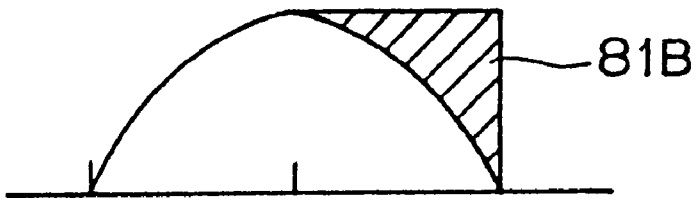

In such case, an S/N error rate of a signal to be transmitted is also deteriorated, since a region 81B shown in FIG. 8(b) cannot be effectively used.

Figure 9:
FIG. 9 is a diagram showing an optimum transmit signal spectrum.

It is therefore considered that a size of the limit frame of the precoder has a certain optimum value. When the transmit spectrum is flat, the S/N error rate becomes the smallest. For this, it is assumed that an optimum value of the limit frame of the precoder can make the transmit spectrum flat as shown in FIG. 9.

Figure 10:
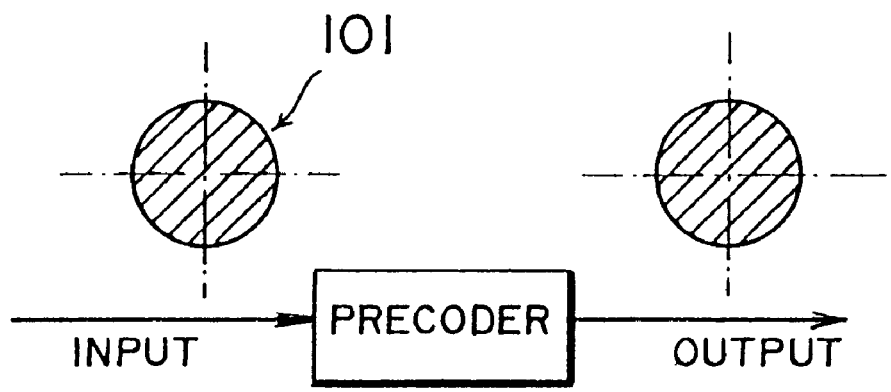
FIG. 10 is a diagram showing maximum values of an input and an output of a precoder when an ideal precoder limit frame is set.

To realize this practically, it is considered that it is necessary to coincide a maximum peak value 101 (an area of a signal point region) of a signal point before inputted to the precoder with a maximum peak value 102 of an output of the precoder, as shown in FIG. 10.

When a maximum value of a signal point (a radius of a region in which the signal point is located) is 0.5, a radius of the limit frame of the precoder is approximately 0.23 in order to coincide an output of the precoder with the maximum value of the signal point. In this state, the limit frame of the precoder is smaller than the maximum value of the signal point, further the maximum value of the signal point is larger than twice the radius of the limit frame.

Figure 11:
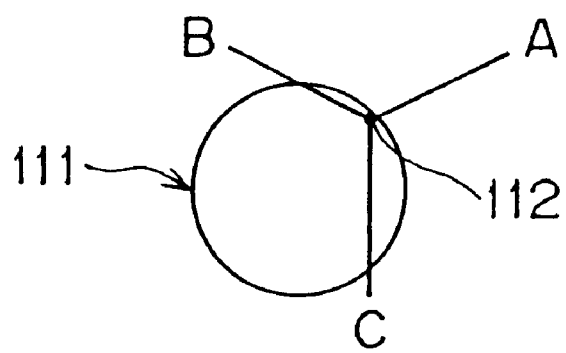
FIG. 11 is a diagram showing an example where the precoder limit frame is small as compared with a signal point maximum value.

FIG. 11 illustrates a case where the precoding is conducted on a signal having a maximum amplitude when the precoder tap value is located on the limit frame of the precoder having the above radius. In FIG. 11, reference numeral 111 denotes a limit frame, whereas reference numeral 112 denotes a tap value. Three signal points A, B and C are set. Intervals among the signals correspond to the above-mentioned maximum peak of the signal point.

In the above case, the three signal points are all located outside the limit frame. For this, a precoder output is headed in a divergent direction even if any signal point is applied. Such limit frame is useless as a limit frame used to prevent divergence of a precoder output. Even if the state as shown in FIG. 11 can make characteristic of the transmit spectrum flat, such state is not suitable for the process by the precoder.

In other words, a setting of a radius of the limit frame of the precoder in the above manner is not being able to attain a primary purpose of the precoder to prevent propagation of an error, although being able to make the characteristic of the transmit spectrum flat.

Meanwhile, signal points are quantized as well as the above-mentioned precoder plane since the process is conducted with digital values in the precoder. An original point and additional signal points are selected from quantized signals. For this, it is impossible to set an ideal intervals of 120° among the three signal points so that an angle as closer to 120° as possible is set. As stated before with reference to FIG. 5, there is generated an error between coordinates of a logical representative point in the judgement plane region and coordinates of a representative point actually outputted as a result of judgement.

Figure 12A:
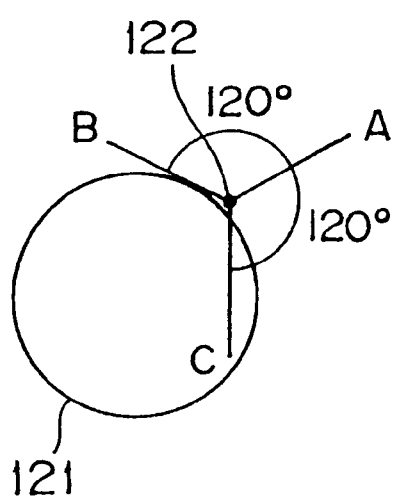
FIGS. 12(a) and 12(b) illustrate an angle margin of a signal point.
Figure 12B:
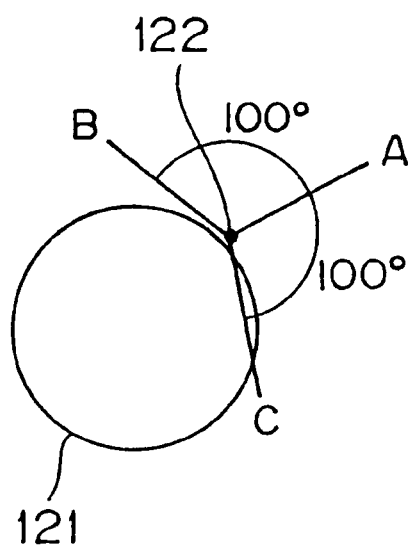

FIG. 12 is a diagram illustrating a problem that three ideal signal points cannot be selected. FIG. 12(a) shows an example of an ideal constellation of signal points, whereas FIG. 12(b) shows an example in which intervals among signal points are shifted from an ideal angle. In FIGS. 12(a) and 12(b), reference numeral 121 denotes a limit frame, and reference numeral 122 denotes a precoder tap value located on the limit frame.

In the example shown in FIG. 12(a), at least one signal point exists within the limit frame even if the precoder tap value locates in any position on the limit frame since the signal points are constellated at ideal intervals of 120°.

To the contrary, in the example shown in FIG. 12(b), intervals between signal points A and B, and signal points A and C are 100° (an interval between signal points B and C is 160°). Although the precoder tap value is located in the same position as the example shown in FIG. 12(a), no signal point exists within the limit frame since an angle made by the signal points B and C is larger than the ideal angle in the case of FIG. 12(b). In this state, an output of the precoder may diverge.

However, it is possible to give a margin to an angle made by the signal points depending on a relation between a radius of the limit frame of the precoder and a maximum peak value of the signal point. This margin of the angle will be hereinafter referred as an angle margin.

FIG. 13 is a diagram showing how much angle margin is permitted when a relation between the limit frame of the precoder and a maximum peak value of a signal point is varied.

Figure 13B:
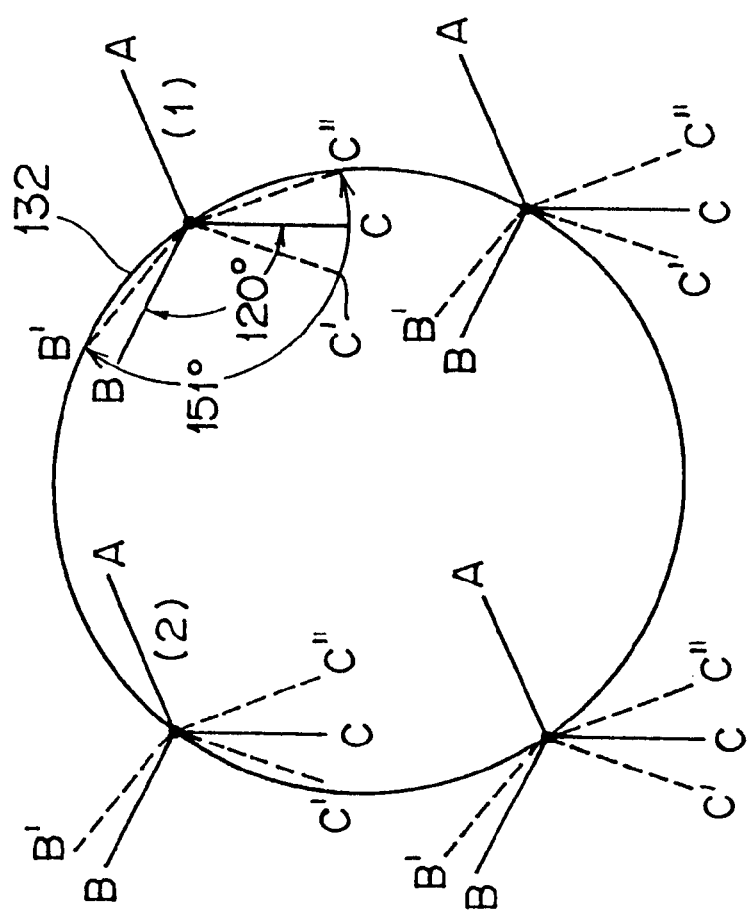
FIGS. 13(a) and 13(b) show a difference in angle margin depending on a size of the precoder limit frame.
Figure 13A:
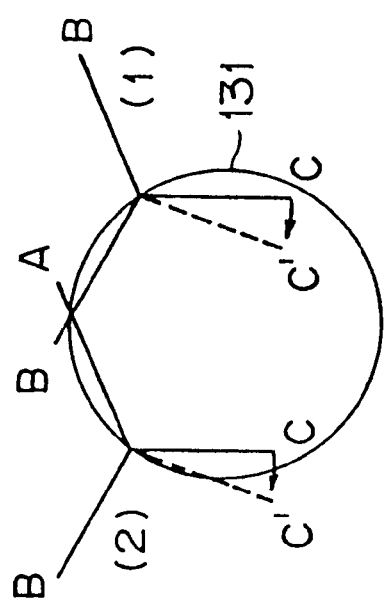

FIG. 13(a) illustrates a case where a maximum peak value of a signal point is large as compared with a radius of a limit frame 131 of the precoder. FIG. 13(b) illustrates a case where a limit frame 132 of the precoder is large as compared with a maximum peak value of the signal point.

In the case of FIG. 13(a), there is a possibility that all signal points are out of the limit frame 131 at a certain position when an angle made by the signal points is changed since a peak value of the signal point is large as compared with a radius of the limit frame 131 of the precoder.

It is assumed here that signal points A through C constellated at an ideal angle of 120° can fall within the limit frame no matter which position in the limit frame the precoder tap value is located in. If the signal point C is located in a position C' due to an error in quantization, a signal point C" can enter the limit frame in a state (1) in FIG. 13(a). However, in a state (2) in FIG. 13(a), the signal point C" cannot enter the limit frame although the ideal signal point C can enter the limit frame.

Signal points should be inside the limit frame no matter which position in the limit frame the precoder tap value is located in. It can be seen that it is difficult to constellate the signal points in a state shown in FIG. 13(a), where there is no margin for an angle of the signal point.

On the other hand, a radius of the limit frame is large as compared with a maximum value of the signal point in the case of FIG. 13(b). (1) and (2) in FIG. 13(b) are in corresponding phases of (1) and (2) in FIG. 13(a). Peak values of signal points in both FIGS. 13(a) and 13(b) are in equal. In the case of FIG. 13(b), it is possible to house signal points B and C in the limit frame in a state where the signal points are constellated at intervals of 120° no matter which position in the limit frame the precoder tap value is located in.

In a position (1) in FIG. 13(b), if an angle made by the signal points B and C is opened to 151°, for example, the signal points B' and C" obtained after the angle has been opened are located within the limit frame. In another position other than the position (1), any one of signal points A, B and C (or A', B' or C") can always fall in the limit frame.

Further, if the precoder tap value is located in a position (2) and the signal point C is located in a position C' similarly to FIG. 13(a), it is unnecessary to care about an angle of the signal point C' since the signal point A, which is outside the limit frame in FIG. 13(a), enters in the limit frame in FIG. 13(a) although the signal point C' may get out of the limit frame.

As above, when a size of the limit frame is large as compared with a maximum value of a signal point, it is possible to give a larger margin for an angle of a signal point.

Since an error is generated between an ideal judgement plane angle (i.e., 22.5° in the case of 16 divided regions) and an actual judgement plane angle in the case of a quantized judgement plane shown in FIG. 5, consideration on the error is necessary upon judgement by the precoder.

FIG. 14 is a diagram illustrating the angle margin, where four examples in which radius of the limit frame to a maximum value of a signal point are 0.5, 1.0, 1.5 and 2.0 are shown.

A logical limit value A represents a maximum angle which can be made by signal points as shown in FIG. 13. When a radius of the limit frame is 0.5, the logical limit value is 120°. When a radius of the limit frame is 1.0, the logical limit value is 151°. When a radius of the limit frame is 1.5, the logical limit value is 160°. When a radius of the limit frame is 2.0, the logical value is 165°.

An item B of A-120° shows a difference between 120° which is an ideal angle in signal point constellation and A. When a radius of the limit frame is 0.5, B is 0°, which means that there is no margin. When a radius of the limit frame is 1.0, B is 31°. When a radius of the limit frame is 1.5, B is 40°. When a radius of the limit frame is 2.0, B is 45°. In consequence, it is known that the margin becomes larger as a radius of the limit frame is greater.

Signal point deviation C shows a difference between an actual angel of quantized signal points and an ideal angle (120°). Angles shown here are only examples so that the angles do not always take shown values. An angle C is changed according to quantization of a signal point.

No matter which value a radius of the limit frame takes, deviation caused by quantization of signal points is unchanged such that a deviation width are 8.7° on the plus side, 11.7° on the minus side, and 20.4° in total. Here, the plus side and the minus side are to define directions in which deviation of a signal point is generated. In the case of the signal point C in FIG. 10, angle deviation toward the origin is assigned as the plus side, whereas angle deviation in a direction away from the origin is assigned as the minus side.

Judgement plane deviation D shows a deviation between an angle on the above-mentioned ideal judgement plane and an angle on a quantized judgement plane. when a radius of the limit frame is 0.5, judgement plane deviation is ±25° and a width is 50°. When a radius of the limit frame is 1.0, deviation D is ±18.3° and a width is 36.5°.

Angle margin is obtained by subtracting the signal point deviation C and the judgement plane deviation D from B. When a radius of the limit frame is 1.0, an angle margin is 4.0° on the plus side and +1.0° on the minus side, and a width is 5.1° (including an error). When a radius of the limit frame is 0.5, an angle margin is −33.7° on the plus side and −36.7° on the minus side, and a width is −70.4°. Minus values of the angle margin signify that any one of the signal points cannot fall within the limit frame at any actual angle.

It is therefore desirable to set a radius of the limit frame 1.0 or larger in the example shown in FIG. 14. However, when the limit frame is excessively large, the S/N error rate of a transmit signal is increased as described before. In consequence, it is desirable to set a radius of the limit frame to approximately 1.0 in the example shown in FIG. 14.

In the above-mentioned manner of judgement using regions divided in the phase direction, it is unnecessary to judge whether the tap value exceeds the limit frame or not by the position information judging unit 12a since a position of the tap value in the amplitude direction is not cared so that the limit frame is deleted in fact.

The position information judging unit 12a judges a position on the vector plane of the precoder tap value using the above-mentioned precoder judgement plane, and transmits a result to the simplified precoder 11c.

The simplified precoder 11c conducts the precoder process on a representative point in a region to which the precoder tap value belongs notified from the position information judging unit 12a on the basis of three signal points generated by the signal point generating unit 11a.

The minimum point selecting unit 11d judges which signal point among the three signal points is closest to the origin according to results obtained through the precoder process conducted on the representative point by the simplified precoder 11c, and notifies a result to the ABC selecting unit 11b.

In the preceding apparatus according to this embodiment, only the upper-lower dividing unit 13a and the precoder 13b are configured in the DSP. Another components are configured with ROMs. It is thereby possible to largely decrease the number of process cycles of the DSP and decrease a load on the DSP so that another processes can be conducted in the same DSP. As a result, it is possible to decrease the number of DSPs mounted in, for example, a modem.

Figure 15:
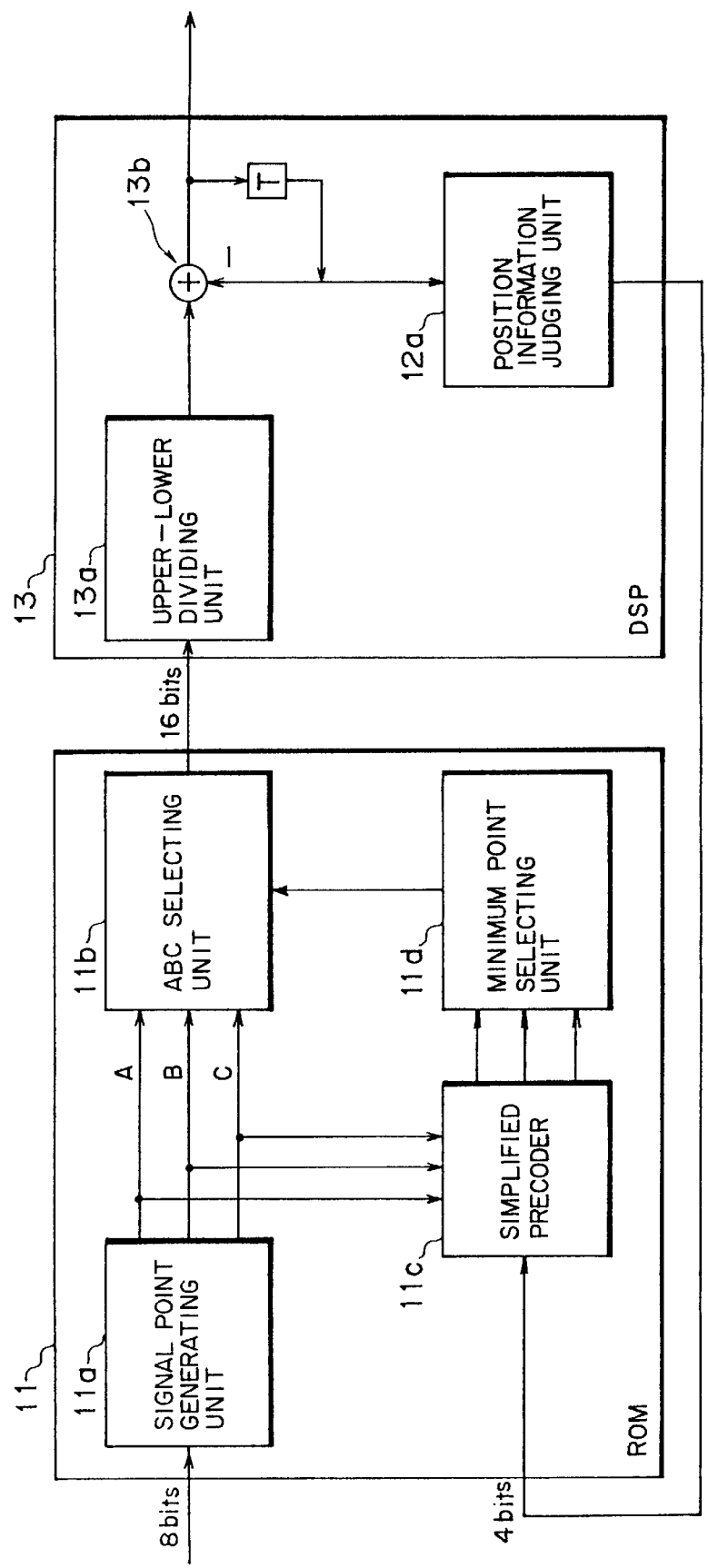
FIG. 15 is a block diagram showing a preceding apparatus according to another embodiment of this invention.

FIG. 15 is a diagram showing a preceding apparatus according another embodiment. In FIG. 15, the position information judging unit 12a is mounted on the DSP 13 along with the upper-lower dividing unit 13a and the precoder unit 13b. In this case, the ROM 11 can conduct a process to judge a minimum signal point requiring the largest number of process cycles so that a load on the DSP 13 can be decreased as compared with a known precoder.

As stated above, it is possible to assign only a part of the precoder process to the DSP so that not only a load of the process by the DSP can be decreased but also a scale of the apparatus can be decreased.

In judgement of a signal point position, the present invention requires a less number of regions on the judgement plane necessary for the judgement so that the judgement of the signal point position can be made more easily.

What is claimed is:

1. A judging method for judging where an inputted object data signal point is locally located on a vector plane when data to be transmitted or data received is modulated or demodulated at high speed, said judging method comprising the steps of:

(a) dividing the vector plane into a plurality of segmental regions by a number of diagonal lines passing the center of the vector plane;

(b) judging which one of the segmental regions the inputted object signal point is located at; and (c) outputting a signal indicating coordinates of said one segmental region on the vector plane.

2. A preceding apparatus having a precoder adder and a precoder tap to calculate a difference between an inputted signal point and a precoder tap value stored in said precoder tap by said precoder adder and output a result of the calculation besides storing the same in said precoder tap comprising:

a plurality of signal points generating unit for generating a plurality of signal points corresponding to said inputted signal point;

a signal point selecting unit for selecting an optimum signal point among said plurality of signal points and supplying said optimum signal point to said precoder adder;

a position information judging unit inputted thereto said precoder tap value to judge a position on a vector plane of said precoder tap value and output position information;

a differentiating means inputted thereto said plurality of signal points and said position information to calculate a difference between said position information and coordinate values of each of said plurality of signal points and output results of the calculation; and a minimum point selecting unit for selecting a signal point at which an amplitude of a signal is minimum according to said results of the calculation on the basis of outputs from said differentiating means and notifying a result of the selection to said signal point selecting unit;

said signal point selecting unit supplying said signal point selected by said minimum point selecting unit to said precoder adder;

said position information judging unit judging a position on said vector plane in which said precoder tap value is located using a judgement plane obtained by dividing said vector plane regions in a phase direction thereof and outputting a signal showing coordinates of a representative point representing a vector region plane in which said precoder tap value is located to said differentiating means.

3. A preceding apparatus having a precoder adder and a precoder tap to calculate a difference between an inputted signal point and a precoder tap value stored in said precoder tap by said precoder adder, and output a result of the calculation besides storing the same in said precoder tap comprising:

a plurality of signal points generating unit for generating a plurality of signal points corresponding to a signal point inputted from the outside;

a signal point selecting unit for selecting an optimum signal point among said plurality of signal points and supplying said optimum signal point to said precoder adder;

a position information judging unit inputted thereto said precoder tap value to judge a position on a vector plane of said precoder tap value and output position information;

a differentiating means inputted thereto said plurality of signal points and said position information to calculate a difference between said position information and coordinate values of each of said plurality of signal points and output results of the calculation; and a minimum point selecting unit for selecting a signal point at which an amplitude of a signal is minimum according to said results of the calculation on the basis of outputs from said differentiating means and notifying a result of the selection to said signal point selecting unit;

at least said precoder adder and said precoder tap being provided in a digital signal processor;

at least said plurality of signal points generating unit, said signal point selecting unit, said differentiating means and said minimum point selecting unit being configured with a read only memory, and outputting an optimum signal point with said signal point inputted from the outside and said position information received from said position information judging unit as addresses.

4. A preceding apparatus comprising:

position information judging means for judging which position on a vector plane the one timing-preceding output signal is located in;

means for obtaining a difference between the judged position of the vector plane and each of second signal points, which are generated for an input first signal point, and outputting one second signal point, at which the obtained difference is minimum, based on both the result of the judgement and the input first signal point; and a precoder for obtaining a difference between the one timing-preceding output signal and the one second input signal point.

5. A precoding apparatus having a precoder for calculating a difference between an inputted signal point and an output signal obtained one timing before and outputting said difference comprising:

a position information judging unit for judging which position on a vector plane said output signal obtained one timing before is located in; and a signal point selecting storage for outputting any signal point among a plurality of signal points generated correspondingly to a signal point first inputted with a result of the judgement fed from said position information judging unit and said signal point first inputted as addresses;

said signal point selecting storage further comprising:

a vector information storing unit for storing vector information about a plurality of signal points correspondingly to said signal point first inputted and outputting said vector information about said plurality of signal points with said signal point first inputted as an address;

a difference information storing unit for storing information about a difference between a result of the judgement fed from said position information judging unit and the vector information about each of said plurality of signal points fed from said vector information storing unit correspondingly to said vector information about said plurality of signal points and said result of the judgement, and outputting said information about a difference between said result of the judgement and said vector information of each of said plurality of signal points with said vector information about each of said plurality of signal points and said result of the judgement as addresses;

a minimum point information storing unit for storing information about a signal point at which difference information fed from said difference information storing unit is minimum correspondingly to said difference information, and outputting said information about said signal point in which said difference information is minimum with said difference information as an address;

and an optimum signal point storing unit for storing information about an optimum signal point that should be selected as said inputted signal point in said precoder correspondingly to said information about said signal point at which said difference information is minimum fed from said minimum point information storing unit and said vector information about each of said plurality of signal points fed from said vector information storing unit, and outputting said information about said optimum signal point that should be selected as said inputted signal point in said precoder with said information about said signal point in which said difference information is minimum and said vector information about each of said plurality of signal points as addresses.

6. A precoding apparatus having a precoder for calculating a difference between an inputted signal point and an output signal obtained one timing before and outputting said difference comprising:

a position information judging unit for judging which position on a vector plane said output signal obtained one timing before is located in; and a signal point selecting storage for outputting any signal point among a plurality of signal points generated correspondingly to a signal point first inputted with a result of the judgement fed from said position information judging unit and said signal point first inputted as addresses;

said position information judging unit being configured with a judgement information storage for storing judgement information as to which position on the vector plane an output signal obtained one timing before is located in correspondingly to said output signal obtained one timing before, and outputting said judgement information as to which position on said vector plane said output signal obtained one timing before is located in with said output signal obtained one timing before as an address.

7. The precoding apparatus according to claim 6, wherein said judgement information storage stores said judgement information as to which position on said vector plane divided into a plurality of regions in a phase direction said output signal obtained one timing before is located in if an amplitude of said output signal obtained one timing before is above a predetermined level, and said judgement information as to which position on said vector plane divided into a plurality of grid-like regions said output signal obtained one timing before is located in if an amplitude of said output signal obtained one timing before is below said predetermined level.

8. A precoding apparatus having a precoder for calculating a difference between an inputted signal point and an output signal obtained one timing before and outputting said difference comprising:

a position information judging unit for judging which position on a vector plane said output signal obtained one timing before is located in; and a signal point selecting storage for outputting any signal point among a plurality of signal points generated correspondingly to a signal point first inputted with a result of the judgement fed from said position information judging unit and said signal point first inputted as addresses;

said judgement information having an information quantity smaller than an information quantity of said output signal obtained one timing before.

9. The preceding apparatus according to claim 5, wherein said information about said optimum signal point outputted from said optimum signal point storing unit is configured with bit information synthesized from a real number component and an imaginary number component configuring said vector information.

10. The preceding apparatus according to claim 9 further comprising a dividing unit provided in a front stage of said precoder to divide said bit information fed from said optimum signal point storing unit into said bit information of said real number component and said bit information of said imaginary number component.

11. The preceding apparatus according to claim 10, wherein said dividing unit and said precoder are configured with a digital signal processor.

* * * * *